US012111255B2

(12) United States Patent
Shibuya et al.

(10) Patent No.: US 12,111,255 B2
(45) Date of Patent: Oct. 8, 2024

(54) ANALYSIS DEVICE

(71) Applicant: HORIBA, LTD., Kyoto (JP)

(72) Inventors: Kyoji Shibuya, Kyoto (JP); Shota Hamauchi, Kyoto (JP); Hiroki Nishigai, Kyoto (JP)

(73) Assignee: HORIBA, LTD. (JP)

( * ) Notice: Subject to any disclaimer, the term of this patent is extended or adjusted under 35 U.S.C. 154(b) by 232 days.

(21) Appl. No.: 17/615,548

(22) PCT Filed: Jun. 26, 2020

(86) PCT No.: PCT/JP2020/025322
§ 371 (c)(1),
(2) Date: Nov. 30, 2021

(87) PCT Pub. No.: WO2020/262640
PCT Pub. Date: Dec. 30, 2020

(65) Prior Publication Data
US 2022/0236180 A1  Jul. 28, 2022

(30) Foreign Application Priority Data

Jun. 27, 2019 (JP) ................. 2019-120161

(51) Int. Cl.
*G01N 21/39* (2006.01)
*G01N 21/3504* (2014.01)
*G01N 21/01* (2006.01)

(52) U.S. Cl.
CPC ......... *G01N 21/39* (2013.01); *G01N 21/3504* (2013.01); *G01N 2021/0112* (2013.01); *G01N 2201/0691* (2013.01)

(58) Field of Classification Search
CPC ............... G01N 21/39; G01N 21/3504; G01N 2021/0112; G01N 2201/0691
See application file for complete search history.

(56) References Cited

U.S. PATENT DOCUMENTS 4,451,147 A    5/1984   Dobes et al.
6,369,893 B1   4/2002   Christel et al.
(Continued)

FOREIGN PATENT DOCUMENTS

CN    108226064 A    6/2018
CN    108604775 A    9/2018
(Continued)

OTHER PUBLICATIONS

International Search Report dated Sep. 15, 2020 issued for International application No. PCT/JP2020/025322, 6 pgs.
(Continued)

*Primary Examiner* — Jamil Ahmed
(74) *Attorney, Agent, or Firm* — Brooks Kushman P.C.

(57) ABSTRACT

In an analysis device that irradiates light from three or more light sources onto a cell, embodiments proposed herein prevent a reduction in the intensity of light from each light source, and are provided with at least a first light source, a second light source, and a third light source, and an optical system that guides light from the respective light sources onto a cell. The optical system is provided with a second light source optical element that reflects the light from the first light source and transmits the light from the second light source, and a third light source optical element that reflects the light from the first light source that has been reflected by the second light source optical element and the light from the second light source that has been transmitted through the second light source optical element, and transmits the light from the third light source.

9 Claims, 16 Drawing Sheets

(56) References Cited

U.S. PATENT DOCUMENTS

| | | | |
|---|---|---|---|
| 2002/0036824 A1 | 3/2002 | Sasaki | |
| 2006/0215179 A1* | 9/2006 | McMurtry | G01D 5/262 33/503 |
| 2009/0116008 A1 | 5/2009 | Fukuda et al. | |
| 2009/0121154 A1* | 5/2009 | Westphal | G02B 27/141 362/231 |
| 2010/0014096 A1* | 1/2010 | Alameh | G01N 21/255 356/445 |
| 2011/0028824 A1 | 2/2011 | Cole et al. | |
| 2014/0070106 A1 | 3/2014 | Westphal et al. | |
| 2014/0340677 A1 | 11/2014 | Sataka et al. | |
| 2015/0099303 A1 | 4/2015 | Butcher et al. | |
| 2018/0145789 A1* | 5/2018 | Iwasaki | H04B 10/506 |
| 2018/0172581 A1* | 6/2018 | Shibuya | G01J 3/433 |
| 2019/0101491 A1 | 4/2019 | Shibuya et al. | |

FOREIGN PATENT DOCUMENTS

| | | |
|---|---|---|
| CN | 109856078 A | 6/2019 |
| EP | 3077790 A1 | 10/2016 |
| JP | 2001-066250 A | 3/2001 |
| JP | 2001147341 A | 5/2001 |
| JP | 2005-502870 A | 1/2005 |
| JP | 2005017683 A | 1/2005 |
| JP | 2009-115654 A | 5/2009 |
| JP | 2016-515196 A | 5/2016 |
| JP | 6255022 B | 12/2017 |
| JP | 2018081254 A | 5/2018 |
| JP | 2018-531395 A | 10/2018 |
| JP | 6416448 B | 10/2018 |
| JP | 2019066477 A | 4/2019 |
| WO | 03-023349 A2 | 3/2003 |
| WO | 2006134675 A1 | 12/2006 |
| WO | 2014-130829 A1 | 8/2014 |
| WO | WO2015/084676 A1 | 6/2015 |
| WO | 2017-013653 A1 | 1/2017 |

OTHER PUBLICATIONS

Office Action dated Aug. 8, 2023 issued in JP patent application No. 2021-527788.

Office Action dated Jul. 29, 2023 issued in CN patent application No. 202080036382.7.

EESR dated May 25, 2023 issued in EP patent application No. 20832792.4.

Office Action dated Dec. 14, 2023 issued in JP patent application No. 2021-527788.

Decision to grant a patent dated Apr. 9, 2024 issued in JP patent application No. 2021-527788.

* cited by examiner

ANALYSIS DEVICE

CROSS-REFERENCE TO RELATED APPLICATIONS

This application is the U.S. national phase of PCT Application No. PCT/JP2020/025322, filed Jun. 26, 2020, which claims priority to Japanese Patent Application No. 2019-120161, filed Jun. 27, 2019, which are both incorporated by reference herein in their entireties.

TECHNICAL FIELD

The present invention relates to an analysis device that utilizes three or more light sources.

TECHNICAL BACKGROUND

Conventionally, in an analysis device that utilizes light sources such as lasers, in order to measure a plurality of components contained in a sample, there are provided a measurement cell in which the sample is held, a plurality of lasers having mutually different wavelengths that irradiate laser light onto the measurement cell, and a photodetector that detects light that is transmitted through the measurement cell.

At this time, a coupling optical element such as a dichroic mirror or the like is used in order to bring the laser light from the plurality of lasers together on a common optical path, and irradiate this laser light onto the measurement cell. More specifically, in the case of a structure in which three or more lasers are utilized, in order to reduce the size of the optical system, a structure is employed in which a plurality of lasers are arranged side-by-side in a straight line such that light emission directions thereof all face in the same direction, and coupling optical elements are also arranged in a straight line in the same way as the plurality of lasers on the light emission side of the lasers. A structure is thus created by this type of optical configuration in which the laser light emitted from one laser is transmitted through two or more coupling optical elements that are provided so as to correspond to the other lasers, and is irradiated onto the measurement cell.

However, In the above-described transmission type of optical system, the problem arises that the intensity of laser light is reduced each time the laser light is transmitted through the coupling optical elements. Moreover, because it is difficult to increase the transmittance of the coupling optical elements over a broad bandwidth, if the number of lasers is increased, the problem of the reduction in the light intensity becomes markedly more conspicuous. Additionally, in order to prevent any effects from stray light interference that is caused by multipath reflection within the coupling optical elements, in a case in which a wedged coupling optical element is used, because the laser light is refracted each time it is transmitted through a coupling optical element, if the number of the coupling optical elements is increased, then it becomes extremely difficult to adjust the optical axis.

DOCUMENTS OF THE PRIOR ART

Patent Documents

[Patent Document 1] Japanese Patent No. 6255022

DISCLOSURE OF THE INVENTION

Problems to be Solved by the Invention

The present invention was conceived in order to solve the above-described problems and, in an analysis device that irradiates light from three or more light sources onto a cell, it is a principal object thereof to prevent a reduction in the intensity of light from each light source.

Means for Solving the Problem

In other words, an analysis device according to the present invention is an analysis device that irradiates light onto a cell into which a sample has been introduced, detects light that is transmitted through the cell, and analyzes measurement target components contained within the sample, and is characterized in being provided with a plurality of light sources including at least a first light source, a second light source, and a third light source and an optical system that guides light from the respective light sources onto the cell, wherein the optical system is provided with a second light source optical element that reflects the light from the first light source and transmits the light from the second light source, and a third light source optical element that reflects the light from the first light source that has been reflected by the second light source optical element and the light from the second light source that has been transmitted through the second light source optical element, and transmits the light from the third light source.

According to the present invention because light from a first light source is guided onto a measurement cell by being reflected without having been transmitted through a second light source optical element and a third light source optical element, it is possible to prevent a reduction in the intensity of light from the first light source. In addition, because light from the second light source is guided onto the measurement cell by only being transmitted through the second light source optical element and is subsequently reflected without being transmitted through the third light source optical element, it is possible to prevent a reduction in the intensity of light from the second light source. Furthermore, because light from the third light source is guided onto the measurement cell by only being transmitted through the third light source optical element, it is possible to prevent a reduction in the intensity of light from the third light source. In this way, the present invention is not a transmission type of optical system in which laser light emitted from one laser is transmitted through two or more optical elements that have been provided for other lasers, and is then reflected onto a measurement cell, but is instead a reflection type of optical system in which laser light emitted from one laser is reflected by optical elements provided for other lasers, and is then irradiated onto a measurement cell, it is possible to prevent a reduction in the intensity of light from each light source.

Moreover, in order to prevent any effects from stray light interference that is caused by multipath reflection within each coupling optical element, it is desirable that a wedged optical element be used. In this case, if a reflection type of optical system is employed, then because the light from each light source is only transmitted once through an optical element, any difficulty in adjusting the optical axis that is due to light refraction is alleviated.

In order to increase the degree of freedom regarding the positioning of the light sources and to enable the size of the analysis device to be reduced, it is desirable that there be further provided a second light source reflection mirror that reflects the light from the first light source that has been reflected by the second light source optical element and the light from the second light source that has been transmitted through the second light source optical element, and that the third light source optical element reflect the light from the first light source and the light from the second light source that have been reflected by the second light source reflection mirror.

In addition, in order to increase the degree of freedom regarding the positioning of the light sources and to enable the size of the analysis device to be reduced, it is desirable that the optical system be further provided with a first light source reflection mirror that reflects the light from the first light source, and that the second light source optical element reflect the light from the first light source that has been reflected by the first light source reflection mirror.

In order to increase the degree of freedom regarding the positioning of the light sources, the respective reflection mirrors, and the respective optical elements in the analysis device, and to enable the light from the respective light sources to be irradiated in the desired directions, it is desirable that the optical system be further provided with a third light source reflection mirror that reflects the light from the first light source and the light from the second light source that have been reflected by the third light source optical element, and the light from the third light source that has been transmitted through the third light source optical element.

In order to reduce the size of the optical system, it is desirable that the respective reflection mirrors and the respective optical elements be positioned such that an angle of incidence of the reflection light is less than 45 degrees.

More specifically, it is desirable that the wavelengths of the light emitted by each of the first light source, the second light source, and the third light source are all mutually different from each other As a specific embodiment of the respective light sources and the respective optical elements, it is desirable that the first light source, the second light source, and the third light source be arranged in sequence from the light source having the shortest emitted light wavelength, and that the second light source optical element transmit light having a wavelength equal to or longer than that of the light from the second light source, and that the third light source optical element transmit light having a wavelength equal to or longer than that of the light from the third light source.

By employing this type of structure, the second light source optical element and the third light source optical element can be formed by long pass filters (i.e., short wavelength cutoff filters) that cut off light having a wavelength that is shorter than the wavelength of the light from their corresponding light source. As a result, it is easy to design the optical elements.

Moreover, as a specific embodiment of the respective light sources and the respective optical elements, it is desirable that the first light source, the second light source, and the third light source be arranged in sequence from the light source having the longest emitted light wavelength, and that the second light source optical element transmit light having a wavelength equal to or shorter than that of the light from the second light source, and that the third light source optical element transmit light having a wavelength equal to or shorter than that of the light from the third light source.

By employing this type of structure, the second light source optical element and the third light source optical element can be formed by short pass filters (i.e., long wavelength cutoff filters) that cut off light having a wavelength that is longer than the wavelength of the light from their corresponding light source. As a result, it is easy to design the optical elements.

In addition, it is also possible to consider using laser light sources that emit modulated light whose wavelength has been modulated using a predetermined modulation frequency as the respective light sources.

By employing this type of structure, it is possible to analyze the measurement target components by using intensity related signals that are obtained by emitting modulated light whose wavelength has been modulated using a predetermined modulation frequency. As a result, it is possible to reduce any effects from interference components on the concentration of the measurement target components.

It is desirable that the analysis device of the present invention be provided with a photodetector that detects an intensity of light that is transmitted through the cell, a correlation value calculation portion that calculates sample correlation values which are correlation values between intensity related signals that relate to the intensity of the light detected by the photodetector and feature signals from which a predetermined correlation with the intensity related signals is able to be obtained, and a concentration calculation portion that calculates concentrations of the measurement target components using the sample correlation values.

By employing the above-described structure, because sample correlation values between intensity related signals that relate to the intensity of the light transmitted through the cell and feature signals are calculated, and the concentration of measurement target components is calculated using the calculated sample correlation values, it is possible to ascertain characteristics of an absorption signal using a dramatically fewer number of variables without having to convert the absorption signal into an absorption spectrum, and to measure the concentration of measurement target components by means of a simple calculation without having to perform complicated spectral calculation processing. For example, the number of data points required in general spectral fitting is in the order of several hundred points, however, the present invention makes it possible to calculate a concentration to an equivalent level of accuracy using, at most, between approximately several correlation values and several tens of correlation values. As a result, it is possible to dramatically reduce the calculation processing load, and to render any sophisticated calculation processing device unnecessary. In addition, the cost of the analysis device can be cut, and a reduction in the size of the analysis device can also be achieved.

Moreover, it is also desirable that the analysis device of the present invention be further provided with a photodetector that detects an intensity of light that is transmitted through the cell, a frequency component extraction portion that extracts n-fold (wherein n is an integer of 1 or greater) frequency components of the modulation frequency from the intensity related signals relating to the intensity of the light detected by the photodetector, and a second calculation portion that calculates concentrations or light absorbances of the measurement target components based on results of the frequency component extraction performed by the frequency component extraction portion.

By employing this type of structure, because the values obtained by the frequency component extraction portion are values that are directly proportional to the concentration of the measurement target components, it is no longer necessary to perform spectral calculation processing in order to determine a concentration, which it is necessary to perform in a conventional wavelength modulation method, and because only a single modulation frequency is needed, the system can be further simplified and the cost thereof reduced.

Effects of the Invention

According to the above-described present invention, in an analysis device that irradiates light onto a cell from three or more light sources, it is possible to prevent a reduction in the intensity of light from each light source.

DESCRIPTION OF THE REFERENCE NUMERALS

100 . . . Analysis Device
11 . . . Cell
121 . . . First Light Source
122 . . . Second Light Source
123 . . . Third Light Source
13 . . . Optical System
M1 . . . First Light Source Reflection Mirror
E2 . . . Second Light Source Optical Element
M2 . . . Second Light Source Reflection Mirror
E3 . . . Third Light Source Optical Element
M3 . . . Third Light Source Reflection Mirror
14 . . . Photodetector
172 . . . Correlation Value Calculation Portion
174 . . . Concentration Calculation Portion
176 . . . Frequency Component Extraction Portion
177 . . . Concentration Calculation Portion

BEST EMBODIMENTS FOR IMPLEMENTING THE INVENTION

First Embodiment

Hereinafter, an analysis device 100 according to a first embodiment of the present invention will be described with reference to the drawings.

The analysis device 100 of the present embodiment is a concentration measurement device that measures concentrations of measurement target components (in this case, for example, CO, $CO_2$, $N_2O$, NO, $NO_2$, $H_2O$, $SO_2$, $CH_4$, and/or $NH_3$, or the like) contained within a sample gas such as, for example, exhaust gas from an internal combustion engine.

Figure 1:
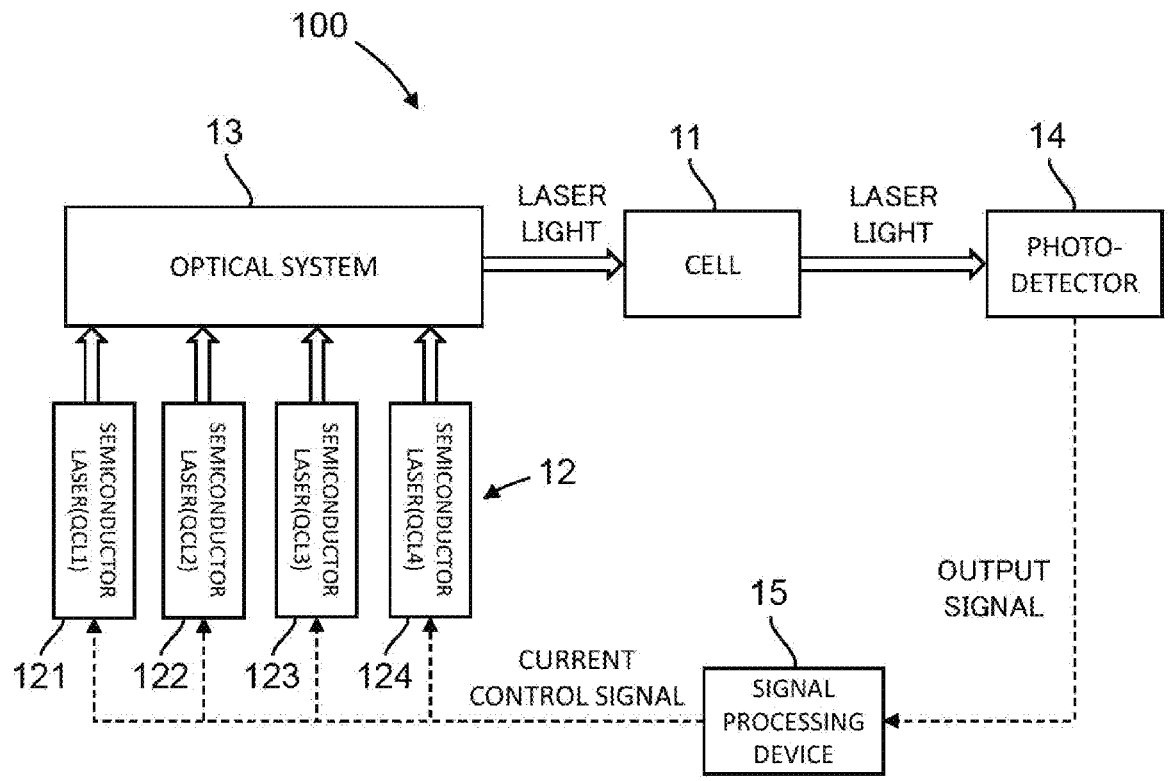
FIG. 1 is an overall schematic view of an analysis device according to an embodiment of the present invention.

More specifically, as is shown in FIG. 1, the analysis device 100 is provided with a cell into which a sample gas is introduced, a plurality of laser light sources 12 that emit laser light which is irradiated onto the cell 11, an optical system 13 that guides the light from the plurality of laser light sources 12 to the cell 11, a photodetector 14 that is provided on an optical path of sample light, which is laser light that is transmitted through the cell 11, and receives this sample light, and a signal processing device 15 that receives output signals from the photodetector 14 and calculates a concentration of a measurement target component based on values contained in the signals.

Each of the portions 11 to 15 will now be described.

The cell 11 is provided with a light entry aperture and a light exit aperture that are formed from a transparent material such as quartz, calcium fluoride, or barium fluoride or the like in which there is essentially no absorption of light in the absorption wavelength band of the measurement target component. An inlet port that is used to introduce a sample gas into the interior of the cell 11, and an outlet port that is used to discharge the sample gas from this interior (neither port is shown in the drawings) are provided in the cell 11. The sample gas is introduced into the cell 11 interior via this inlet port, and is then sealed therein.

The plurality of laser light sources 12 that are used here are quantum cascade lasers (QCL), which are a type of semiconductor laser 12, and oscillate mid-infrared (i.e., between 4~12 μm) laser light. These laser light sources 12 are able to modulate (i.e., change) their oscillation wavelength in accordance with the current (or the voltage) with which they are supplied. Note that it is also possible for other types of lasers to be used provided that the laser has a variable oscillation wavelength, and a method such as changing the temperature or the like in order to change the oscillation wavelength may also be employed. In the present embodiment, a structure having four semiconductor lasers 121~124 is exemplified, however, the present invention is not limited to this provided that three or more lasers are used.

Figure 2A:
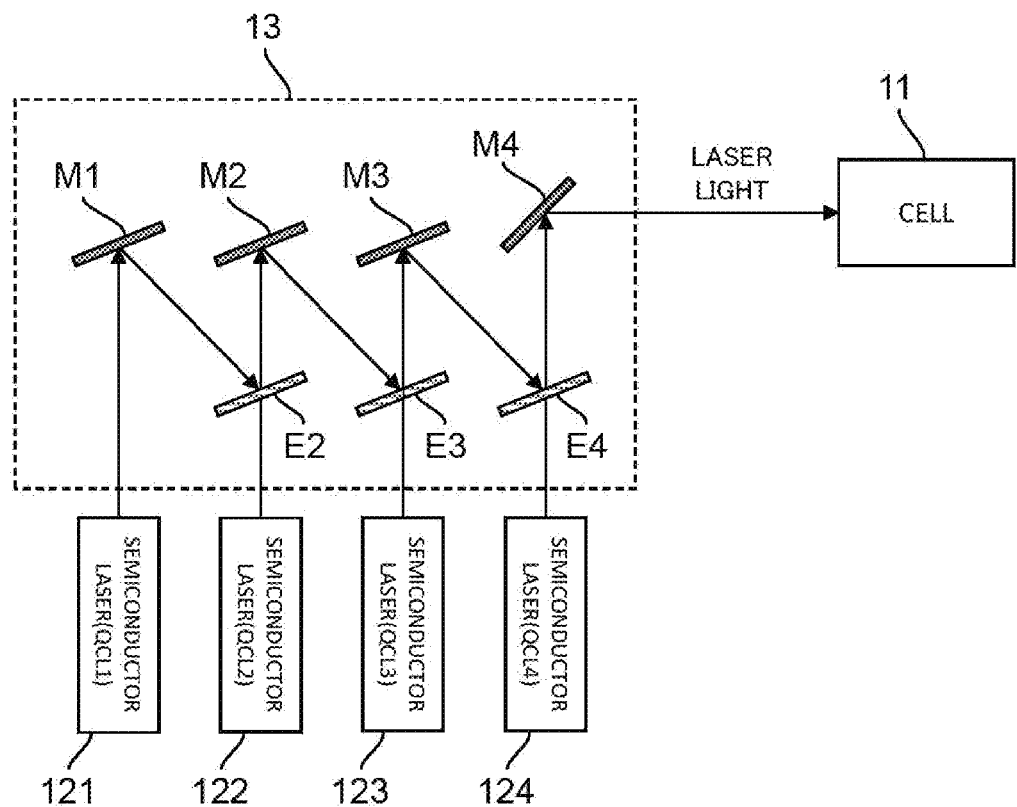
FIG. 2A is a schematic view showing details of an optical system of the same embodiment.

As is shown in FIG. 2A, the optical system 13 causes laser light emitted from the plurality of semiconductor lasers 121~124 to be irradiated via a common optical path onto the cell 11. Note that, in the following description, starting from the left side of FIG. 2A, the plurality of semiconductor lasers 121~124 are referred to as a first laser 121, a second laser 122, a third laser 123, and a fourth laser 124.

Figure 2B:
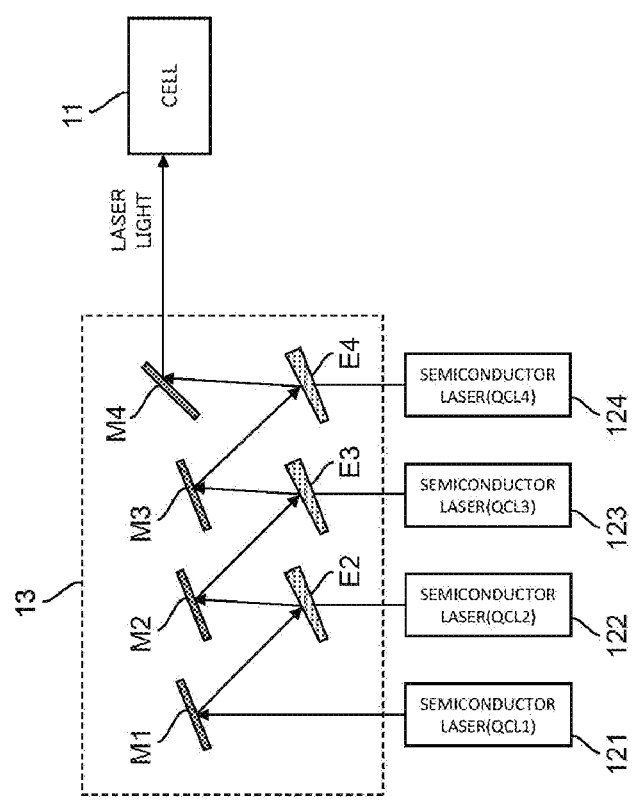
FIG. 2B is a schematic view showing details of an optical system of a variant example of the same embodiment.

More specifically, the optical system 13 is provided with a first light source reflection mirror M1 (hereinafter, referred to as the 'first reflection mirror M1') that is provided so as to correspond to the first laser 121, a second light source optical element E2 (hereinafter, referred to as the 'second optical element E2') and a second light source reflection mirror M2 (hereinafter, referred to as the 'second reflection mirror M2') that are provided so as to correspond to the second laser 122, a third light source optical element E3 (hereinafter, referred to as the 'third optical element E3') and a third light source reflection mirror M3 (hereinafter, referred to as the 'third reflection mirror M3') that are provided so as to correspond to the third laser 123, and a fourth light source optical element E4 (hereinafter, referred to as the 'fourth optical element E4') and a fourth light source reflection mirror M4 (hereinafter, referred to as the 'fourth reflection mirror M4') that are provided so as to correspond to the fourth laser 124. Note that, as is shown in FIG. 2B, in order to prevent any effects from stray light interference that is caused by multipath reflection within the optical element, it is also possible for wedged optical elements to be used for the respective optical elements E2~E4. Here, an angle of between, for example, approximately 0.3~0.5 degrees may be considered for the angle of the wedge.

The first reflection mirror M1 reflects light from the first laser 121 (hereinafter, referred to as 'first laser light'). The first laser light that is reflected by the first reflection mirror M1 travels towards the second optical element E2.

The second optical element E2 reflects the first laser light, and also transmits light from the second light source (hereinafter, referred to as 'second laser light'). The first laser light that is reflected by the second optical element E2, and the second laser light that is transmitted through the second optical element E2 both travel towards the second reflection mirror M2 along the same optical path as each other.

The second reflection mirror M2 reflects the first laser light that has been reflected by the second optical element E2, and the second laser light that has been transmitted through the second optical element E2. The first laser light and the second laser light that are reflected by the second reflection mirror M2 both travel towards the third optical element E3 along the same optical path as each other.

The third optical element E3 reflects the first laser light and second laser light, and also transmits light from the third light source (hereinafter, referred to as 'third laser light'). The first laser light and the second laser light that are reflected by the third optical element E3, and the third laser light that is transmitted through the third optical element E3 all travel towards the third reflection mirror M3 along the same optical path as each other.

The third reflection mirror M3 reflects the first laser light and the second laser light that have been reflected by the third optical element E3, and also the third laser light that has been transmitted through the third optical element E3. The first laser light through the third laser light that are reflected by the third reflection mirror M3 all travel towards the fourth optical element E4 along the same optical path as each other.

The fourth optical element E4 reflects the first laser light through the third laser light, and also transmits light from the fourth light source (hereinafter, referred to as 'fourth laser light'). The first laser light through the third laser light that are reflected by the fourth optical element E4, and the fourth laser light that is transmitted through the fourth optical element E4 all travel towards the fourth reflection mirror M4 along the same optical path as each other.

The fourth reflection mirror M4 reflects the first laser light through the third laser light that have been reflected by the fourth optical element E4, and also the fourth laser light that has been transmitted through the fourth optical element E4. The first laser light through the fourth laser light that are reflected by the fourth reflection mirror M4 all travel towards the cell 11 along the same optical path as each other.

In this optical system 13, the first laser light is reflected by the first reflection mirror M1, the second optical element E2, the second reflection mirror M2, the third optical element E3, the third reflection mirror M3, the fourth optical element E4, and the fourth reflection mirror M4 in this sequence, and is then irradiated onto the cell 11. The second laser light is transmitted through the second optical element E2, and is then reflected by the second reflection mirror M2, the third optical element E3, the third reflection mirror M3, the fourth optical element E4, and the fourth reflection mirror M4 in this sequence, and is then irradiated onto the cell 11. The third laser light is transmitted through the third optical element E3, and is then reflected by the third reflection mirror M3, the fourth optical element E4, and the fourth reflection mirror M4 in this sequence, and is then irradiated onto the cell 11. The fourth laser light is transmitted through the fourth optical element E4, and is then reflected by the fourth reflection mirror M4, and is then irradiated onto the cell 11.

In the present embodiment, starting from the side where the optical path from the cell 11 is the longest (i.e., from the left side of the diagram when looking at FIG. 2A), the first laser 121, the second laser 122, the third laser 123, and the fourth laser 124 are arranged in that sequence progressively from the laser whose emitted laser light wavelength is the shortest to the laser whose emitted laser light wavelength is the longest. The second optical element E2 is a long pass filter (i.e., a short wavelength cutoff filter) that transmits laser light having a wavelength that is equal to or longer than that of the second laser 122 and reflects the first laser light. The third optical element E3 is a long pass filter (i.e., a short wavelength cutoff filter) that transmits laser light having a wavelength that is equal to or longer than that of the third laser 123 and reflects the first laser light and the second laser light. The fourth optical element E4 is a long pass filter (i.e., a short wavelength cutoff filter) that transmits laser light having a wavelength that is equal to or longer than that of the fourth laser 124 and reflects the first laser light through the third laser light.

Moreover, in the present embodiment, as is shown in FIG. 2A, the first laser 121, the second laser 122, the third laser 123, and the fourth laser 124 are arranged side-by-side on a straight line such that their respective light emission directions all face in the same direction. In addition, in the same way as their corresponding lasers 121, 122, and 123, at least the first through third reflection mirrors M1~M3 are arranged side-by-side on a straight line on the light emission side of the lasers 121, 122, and 123. Note that the fourth reflection mirror M4 causes reflected laser light to travel towards the cell 11, and the position thereof is suitably set so as to achieve this.

Furthermore, in the present embodiment, at least the first through third reflection mirrors M1~M3 and the respective optical elements E2~E4 are positioned such that an angle of incidence of the reflected laser light is less than 45 degrees. In other words, at least the first through third reflection mirrors M1~M3 and the respective optical elements E2~E4 are positioned such that an angle between the incident light and the reflected light in each of these is less than 90 degrees. By positioning the first through third reflection mirrors M1~M3 and the respective optical elements E2~E4 in this way, it is possible to reduce the size of the optical system 13.

Returning to FIG. 1, the photodetector 14 and the signal processing device 15 will now be described.

Here, a thermal type of device such as a comparatively low-cost thermopile or the like is used for the photodetector 14, however, another type of device, for example, a quantum-type photoelectric element such as HgCdTe, InGaAs, InAsSb, or PbSe or the like that has excellent responsiveness may also be used.

Figure 3:
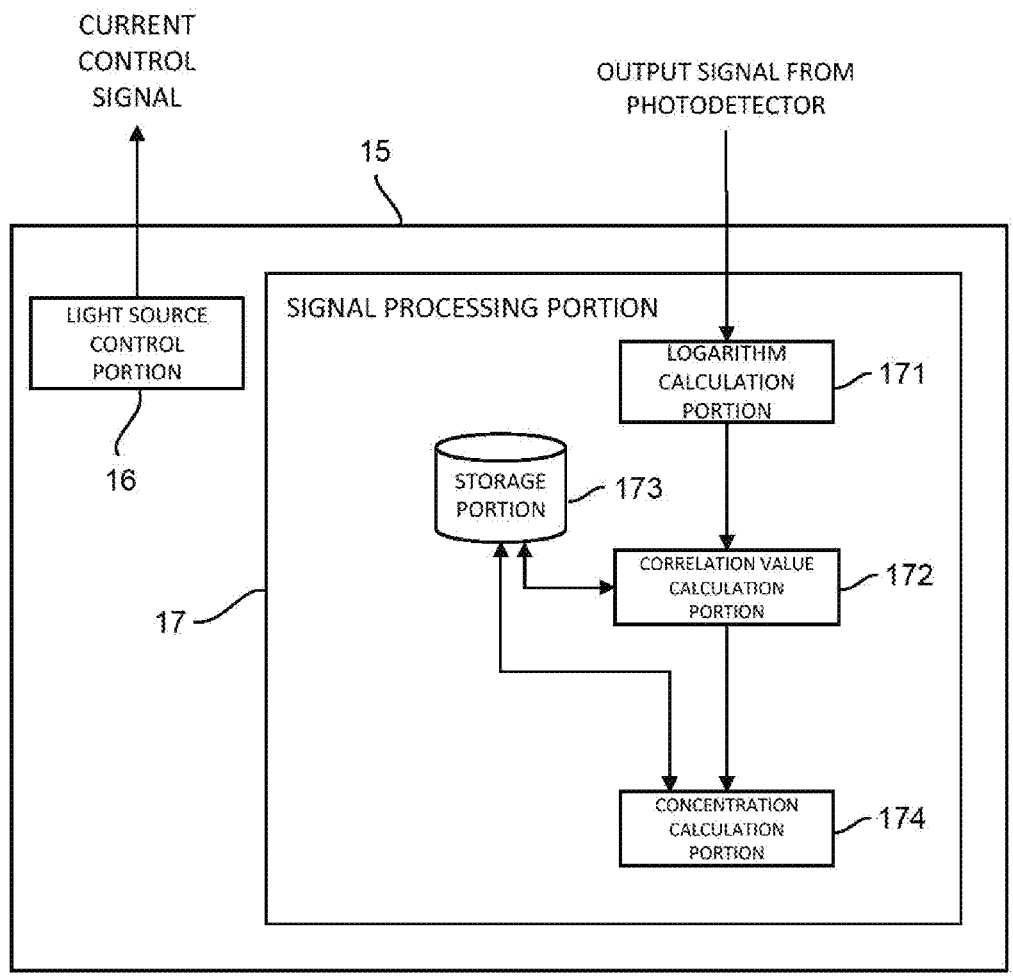
FIG. 3 is a function block diagram of a signal processing device of the same embodiment.

The signal processing device 15 is equipped with at least one of an analog electrical circuit formed by a buffer, an amplifier or the like, a digital electrical circuit formed by a CPU, memory or the like, and an AD converter and/or a DA converter that form interfaces between these analog and digital electrical circuits, or the like. As a result of the CPU and the peripheral devices thereof operating in mutual collaboration in accordance with a predetermined program stored in a predetermined area of the memory, as is shown in FIG. 3, the signal processing device 15 functions as a light source control portion 16 that controls outputs from the semiconductor lasers 12, and a signal processing portion 17 that receives output signals from the photodetector 14, and then performs arithmetic processing on the values contained therein so as to calculate a concentration of measurement target component.

Each of these portions will now be described in further detail.

The light source control portion 16 controls a current source (or a voltage source) of each semiconductor laser 12 by outputting current (or voltage) control signals. More specifically, the light source control portion 16 changes the drive current (or drive voltage) of each semiconductor laser 12 in a predetermined frequency so as to modulate the oscillation wavelength of the laser light output from the semiconductor lasers 12 in a predetermined frequency relative to a central wavelength. Moreover, the light source control portion 16 performs control such that the plurality of semiconductor lasers 121~124 each has an oscillation wavelength that corresponds respectively to one of the different measurement target components. Furthermore, the light source control portion 16 also performs control such that the plurality of semiconductor lasers 121~124 each outputs laser light at a mutually different timing.

Figure 4:
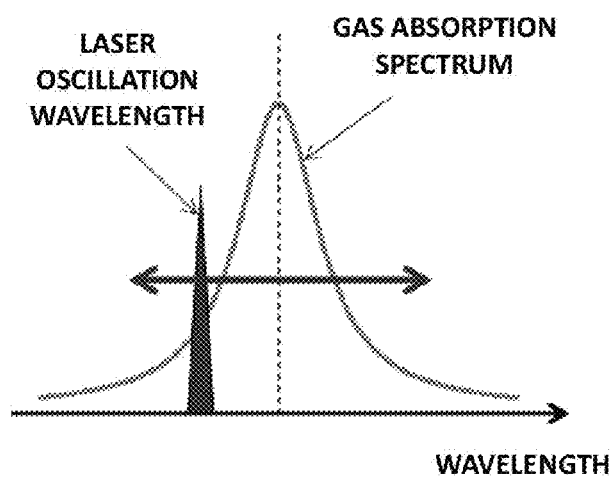
FIG. 4 is a schematic view showing a laser oscillation wavelength modulation method of the same embodiment.
Figure 5:
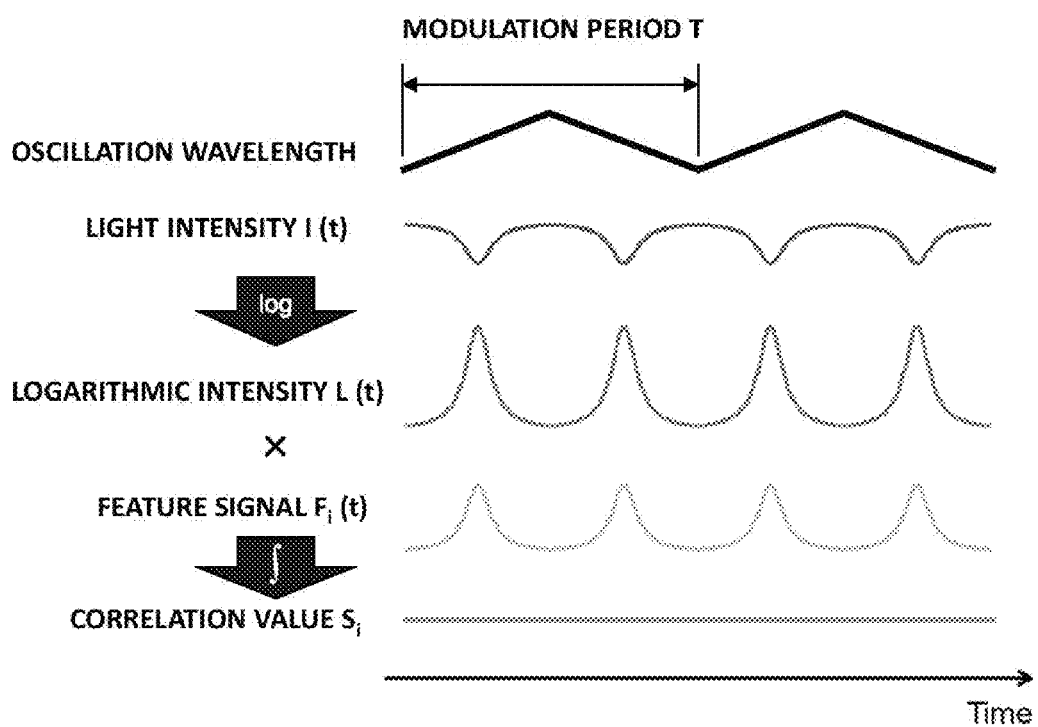
FIG. 5 is a time series graph showing an example of an oscillation wavelength, a light intensity I (t), a logarithmic intensity L (t), a feature signal $F_i$, (t), and a correlation value $S_i$, in the same embodiment.

In the present embodiment, the light source control portion 16 changes the drive current into a triangular waveform, and modulates the oscillation frequency into a triangular waveform (see the 'oscillation wavelength' in FIG. 5). In actuality, the modulation of the drive current is performed using a separate function such that the oscillation frequency has a triangular waveform. Moreover, as is shown in FIG. 4, the oscillation wavelength of the laser light is modulated with a peak of the light absorption spectrum of the measurement target component being taken as a central wavelength. In addition to this, it is also possible for the light source control portion 16 to change the drive current into a sinusoidal waveform or sawtooth waveform, or into a desired functional shape, and for the oscillation frequency to be modulated into a sinusoidal waveform or sawtooth waveform, or into a desired functional shape.

As can be seen in FIG. 3, the signal processing portion 17 is formed by a logarithmic operation portion 171, a correlation value calculation portion 172, a storage portion 173, and a concentration calculation portion 174 or the like.

The logarithmic operation portion 171 performs a logarithmic operation on light intensity signals which are the output signals from the photodetector 14. A function I (t) that shows changes over time in the optical intensity signals obtained from the photodetector 14 has the form shown by the 'optical intensity I (t)' in FIG. 5, and changes to the form shown by the 'logarithmic intensity L (t)' in FIG. 5 after a logarithmic operation has been performed thereon.

The correlation value calculation portion 172 calculates respective correlation values between intensity related signals relating to the intensity of sample light and a plurality of predetermined feature signals. The feature signals are signals that are used to extract waveform features of the intensity related signals as a result of a correlation being obtained between the feature signals and the intensity related signals. Sinusoidal signals, for example, may be used for the feature signals or, alternatively, a variety of signals that are suitable for the waveform feature whose extraction from the intensity related signal is desired may also be used.

Hereinafter, an example of a case in which a signal that is not a sinusoidal signal is used for the feature signal will be described. The correlation value calculation portion 172 calculates respective correlation values between an intensity related signal relating to the intensity of the sample light, and a plurality of feature signals that enable different correlations relative to the intensity related signals to be obtained from that obtained by using a sinusoidal wave signal (i.e., a sinusoidal function). Here, the correlation value calculation portion 172 uses a light intensity signal (logarithmic intensity L (t)) that has been logarithmically calculated as the intensity related signal.

Moreover, the correlation value calculation portion 172 calculates a plurality of sample correlation values $S_i$, (t) via the following formula (Equation 1) using a number of feature signals $F_i$, (t) (wherein i=1, 2, . . . , n) that is greater than the number obtained by combining the number of types of measurement target components with the number of types of interference components. Note that 'T' in Equation 1 is the modulation period.

$$S_i = \int_0^T L(t) \cdot F_i(t) dt (i=1,2, \ldots ,n)$$

$$R_i = \int_0^T L_0(t) \cdot F_i(t) dt (i=1,2, \ldots ,n) =$$

$$S_i' = S_i - R_i \qquad \text{[Equation 1]}$$

When calculating the sample correlation value, the correlation value calculation portion 172 determines the correlation value $S_i$ between the intensity related signal L (t) of the sample light and the plurality of feature signals $F_i$ (t) as is shown in the above formula (Equation 1). In addition, the correlation value calculation portion 172 determines a reference correlation value $R_i$, which is a correlation value between an intensity related signal $L_0$ (t) of reference light and the plurality of feature signals $F_i$ (t) as is also shown in the above formula (Equation 1). The correlation value calculation portion 172 then calculates a sample correlation value $S_i'$ by subtracting the reference correlation value $R_i$ from the correlation value S as is also shown in the above formula (Equation 1). As a result, offset contained in the sample correlation values is removed, and the correlation values thereby obtained are proportional to the concentrations of the measurement target components and the interference components so that measurement errors can be reduced. Note that it is also possible to employ a structure in which the reference correlation values are not subtracted.

Here, the acquisition timing when the reference light is acquired is either the same time as when the sample light is acquired, or is approximately when the measurement is performed, or is an arbitrary timing. The reference light intensity related signals or the reference correlation values may also be acquired in advance and stored in the storage portion 173. The method that is used when the reference light is acquired at the same time as the sample light may be a method in which, for example, two photodetectors 14 are provided. The modulation light from the semiconductor lasers 12 may then be split by a beam splitter or the like, with one portion of the split light being used to measure the sample light, and another portion thereof being used to measure the reference light.

In the present embodiment, the correlation value calculation portion 172 uses, as the plurality of feature signals $F_i$ (t), functions that enable the waveform features of the logarithmic intensity L (t) to be more easily ascertained than a sinusoidal function. In the case of a sample gas that contains a measurement target component (for example, $SO_2$) and one interference component (for example, $H_2O$), using two or more feature signals $F_1$ (t) and $F_2$ (t) may be considered. As these two feature signals $F_1$ (t) and $F_2$ (t), for example, using a function that is based on a Lorentz function that is similar to the shape of the absorption spectrum, and a differential function of a function that is based on this Lorentz function may be considered. In addition, as the feature signals, instead of a function that is based on a Lorentz function, it is also possible to use a function that is based on a Voigt function, or a function that is based on a Gaussian function, or the like. By using functions such as these for the feature signals, it is possible to obtain a larger correlation value than when a sinusoidal function is used, and it is thereby possible to improve the measurement accuracy.

Here, it is desirable that direct current components be removed from the feature signal. In other words, if direct current components are integrated in the modulation period, then it is desirable that the offset be adjusted so that these are reduced to zero. By employing this method, it is possible to remove any effects that arise from offset being added to the intensity related signals due to variations in the light intensity. Note that, instead of removing direct current components from the feature signal, it is also possible for direct current components in the intensity related signal to be removed, or for direct current components in both the feature signal and the intensity related signal to be removed. In addition to this, it is also possible for actual measurement values for the absorption signal of measurement target components and/or interference components, or else for simulated values thereof to be used respectively for the feature signals.

Note that by forming the two feature signals $F_1$ (t) and $F_2$ (t) as orthogonal function sequences that are mutually orthogonal to each other, or as function sequences that are analogous to orthogonal function sequences, it is possible to more efficiently extract the features of the logarithmic intensity L (t), and to improve the accuracy of a concentration obtained using the simultaneous equations described below.

The storage portion 173 stores individual correlation values which are the respective correlation values per unit concentration for the measurement target components and each interference component determined from the respective intensity related signals and the plurality of feature signals $F_i$ (t) in a case in which the measurement target components and each of the interference components are present individually. The plurality of feature signals $F_i$ (t) that are used to determine these individual correlation values are the same as the plurality of feature signals $F_i$ (t) used by the correlation value calculation portion 172.

Here, when storing the individual correlation values, it is desirable that the storage portion 173 store individual correlation values that are corrected by subtracting the reference correlation values from the correlation values obtained in a case in which the measurement target components and the respective interference components are present individually, and then converting the resulting correlation values into per unit concentrations. As a result, any offset contained in the individual correlation values is removed, and the obtained correlation values are proportional to the concentrations of the measurement target components and the interference components so that measurement errors can be reduced. Note that it is also possible to employ a structure in which the reference correlation values are not subtracted.

The concentration calculation portion 174 calculates concentrations of measurement target components using the plurality of sample correlation values obtained by the correlation value calculation portion 172.

More specifically, the concentration calculation portion 174 calculates concentrations of the measurement target components based on the plurality of sample correlation values obtained by the correlation value calculation portion 172, and on the plurality of individual correlation values stored in the storage portion 173. Still more specifically, the concentration calculation portion 174 calculates concentrations of the measurement target components by solving simultaneous equations made up of the plurality of sample correlation values obtained by the correlation value calculation portion 172, the plurality of individual correlation values stored in the storage portion 173, and the respective concentrations of the measurement target components and of each interference component.

Next, in conjunction with the foregoing detailed description of the respective portions, an example of an operation of this analysis device 100 will be described. In the following description, a case in which a single measurement target component (for example, $SO_2$) and a single interference component (for example, $H_2O$) are contained in the sample gas is assumed.

[Reference Measurement]

Firstly, the light source control portion 16 controls the respective semiconductor lasers 121~124, and modulates the wavelength of the laser light in the modulation frequency and so as to take the peak of the absorption spectrum of the measurement target component as the center thereof. Note that, prior to making the reference measurement using a span gas, it is also possible for a reference measurement to be made using a zero gas, and to then measure the reference correlation value.

Next, a span gas (i.e., a gas having known component concentrations) is introduced into the interior of the cell 11 either by an operator or automatically, and a reference measurement is made. This reference measurement is made for each of a span gas in which the measurement target component is individually present, and a span gas in which the interference component is individually present.

More specifically, in the reference measurement, the logarithmic operation portion 171 receives an output signal from the photodetector 14 and calculates the logarithmic intensity L (t). In addition, the correlation value calculation portion 172 calculates correlation values between this logarithmic intensity L (t) and the two feature signals $F_1$ (t) and $F_2$ (t), and then subtracts the reference correlation value from these correlation values. The resulting values are then divided by the concentration of the span gas so that individual correlation values, which are correlation values of each span gas per unit concentration, are obtained. Note that, instead of calculating the individual correlation values per unit concentration, it is also possible to store relationships between the span gas concentrations and the individual correlation values of the relevant span gas in advance.

More specifically, the following method may be employed.

Figure 6:
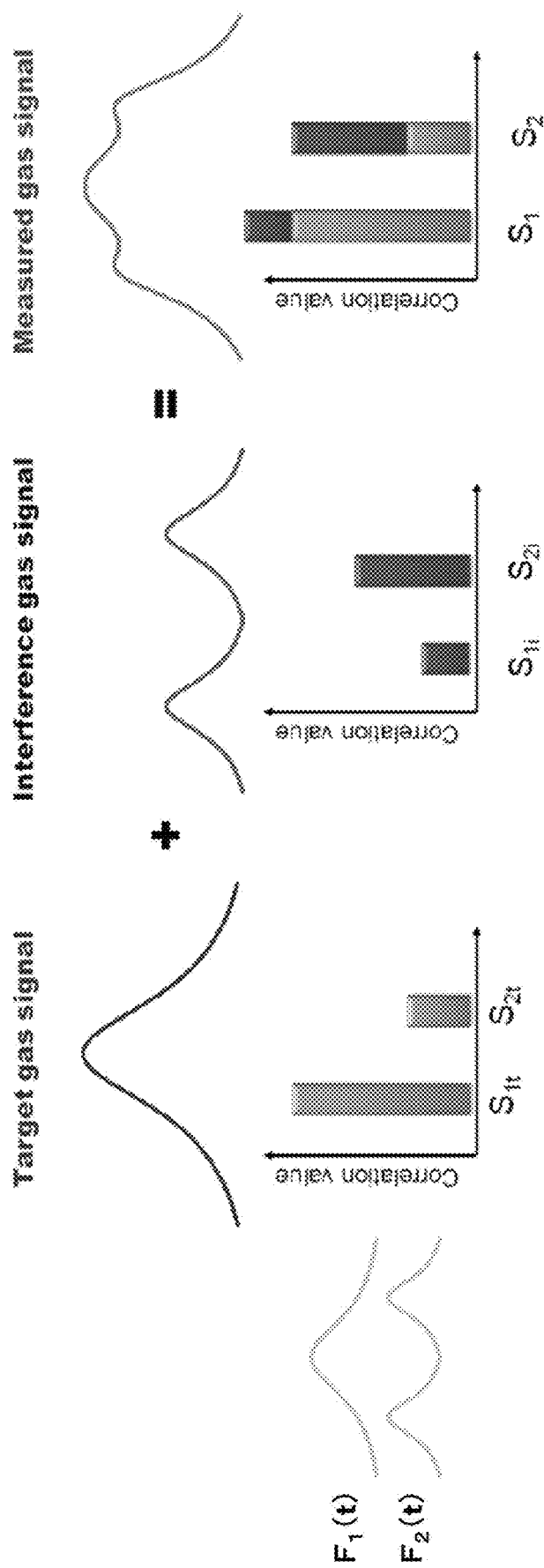
FIG. 6 is a view showing conceptual diagrams of a concentration calculation that utilizes individual correlation values and sample correlation values in the same embodiment.

A span gas in which the measurement target component is individually present is introduced into the cell 11, and correlation values $S_{1t}$ and $S_{2t}$ of the measurement target component are calculated by the correlation value calculation portion 172 (see FIG. 6). Here, $S_{1t}$ is a correlation value with a first feature signal, and $S_{2t}$ is a correlation value with a second feature signal. The correlation value calculation portion 172 then calculates the individual correlation values $s_{1t}$ and $s_{2t}$ by subtracting the reference correlation value $R_1$ from these correlation values $S_{1t}$ and $S_{2t}$, and then dividing the resulting values by a span gas concentration $c_t$ of the measurement target component. Note that the span gas concentration $c_t$ of the measurement target component is input in advance into the signal processing portion 17 by a user or the like.

Moreover, correlation values $S_{1i}$ and $S_{2i}$ of the interference component are calculated as a result of the correlation value calculation portion 172 (see FIG. 6) introducing a span gas in which the interference component is individually present into the cell 11. Here, $S_{1i}$ is a correlation value with the first feature signal, and $S_{2i}$ is a correlation value with the second feature signal. The correlation value calculation portion 172 then calculates the individual correlation values $s_{1i}$ and $s_{2i}$ by subtracting the reference correlation value from these correlation values $S_{1i}$ and $S_{2i}$, and then dividing the resulting values by a span gas concentration $c_i$ of the interference component. Note that the span gas concentration c of the interference component is input in advance into the signal processing portion 17 by a user or the like.

The individual correlation values $s_{1t}$, $s_{2t}$, $s_{1i}$, and $s_{2i}$ calculated in the manner described above are stored in the storage portion 173. Note that these reference measurements may be made before a product is shipped, or alternatively, they may be made periodically.

[Sample Measurement]

The light source control portion 16 controls the respective semiconductor lasers 121~124, and modulates the wavelength of the laser light in the modulation frequency and taking the peak of the absorption spectrum of the measurement target component as the center.

Next, a sample gas is introduced into the interior of the cell 11 either by an operator or automatically, and a sample measurement is made.

More specifically, in the sample measurement, the logarithmic operation portion 171 receives an output signal from the photodetector 14 and calculates the logarithmic intensity L (t). In addition, the correlation value calculation portion 172 calculates sample correlation values between this logarithmic intensity L (t) and the plurality of feature signals $F_1$ (t) and $F_2$ (t), and then calculates sample correlation values $S_1'$ and $S_2'$ by subtracting the reference correlation value $R_i$ from these correlation values (see FIG. 6).

The concentration calculation portion 174 then solves the following dual simultaneous equations that are made up of the sample correlation values $S_1'$ and $S_2'$ calculated by the correlation value calculation portion 172, the individual correlation values $s_{1t}$, $s_{2t}$, $s_{1i}$, and $s_{2i}$ stored in the storage portion 173, and the respective concentrations $C_{tar}$ and $C_{int}$ of the measurement target components and the respective interference components.

$$s_{1t}C_{tar}+s_{1i}C_{int}=S_1'$$

$$s_{2t}C_{tar}+s_{2i}C_{int}=S_2' \qquad \text{[Equation 2]}$$

Consequently, by performing the simple and reliable calculation of solving the simultaneous equations of the above formula (Equation 2), it is possible to decide a concentration $C_{tar}$ of the measurement target components from which interference effects have been removed.

Note that, in the same way, it is also possible in a case in which it is assumed that two or more interference components are present to determine the concentration of measurement target components from which interference effects have been removed by adding the same number of individual correlation values as the number of interference components, and then solving simultaneous equations having the same number of variables as the number of component types.

In other words, generally, in a case in which the measurement target components and interference components are combined together so that n number of types of gases are present, then if an individual correlation value of a k-th gas type in an m-th feature signal is taken as $s_{mk}$, a concentration of the k-th gas type is taken as $C_k$, and the sample correlation value in the m-th feature signal $F_m$ (t) is taken as $S_m'$, then the following formula (Equation 3) is established.

$$\begin{aligned} s_{11}C_1 + s_{12}C_2 + s_{13}C_3 + \ldots + s_{1n}C_n &= S_1' \\ s_{21}C_1 + s_{22}C_2 + s_{23}C_3 + \ldots + s_{2n}C_n &= S_2' \\ s_{31}C_1 + s_{32}C_2 + s_{33}C_3 + \ldots + s_{3n}C_n &= S_3' \\ &\vdots \\ s_{n1}C_1 + s_{n2}C_2 + s_{n3}C_3 + \ldots + s_{nn}C_n &= S_3' \end{aligned} \qquad \text{[Equation 3]}$$

By solving the simultaneous equations having the n number of variables shown by this formula (Equation 3), it is possible to determine the concentration of each gas of the measurement target components and interference components.

Effects of the First Embodiment

According to the analysis device 100 of the present embodiment, which is formed in the manner described above, because the laser light emitted from the respective lasers 121~124 are, at most, only transmitted through one of the optical elements E2~E4, it is possible to prevent a reduction in the intensity of laser light emitted from the respective lasers 121~124. As a result, it is possible to suppress any unevenness in the intensity of light from the respective lasers 121~124 that is caused by this light passing through the optical elements E2~E4, and it is also possible to improve the accuracy of the analysis device 100 when measuring each measurement target component. Moreover, even in a case in which a wedged optical element is used, because each of the laser lights only passes once through an optical element, any difficulty in adjusting the optical axis that is due to light refraction is lessened.

Second Embodiment

Next, an analysis device 100 according to a second embodiment of the present invention will be described. The analysis device 100 of the second embodiment differs from that of the first embodiment in the structure of the signal processing portion 17.

Figure 7:
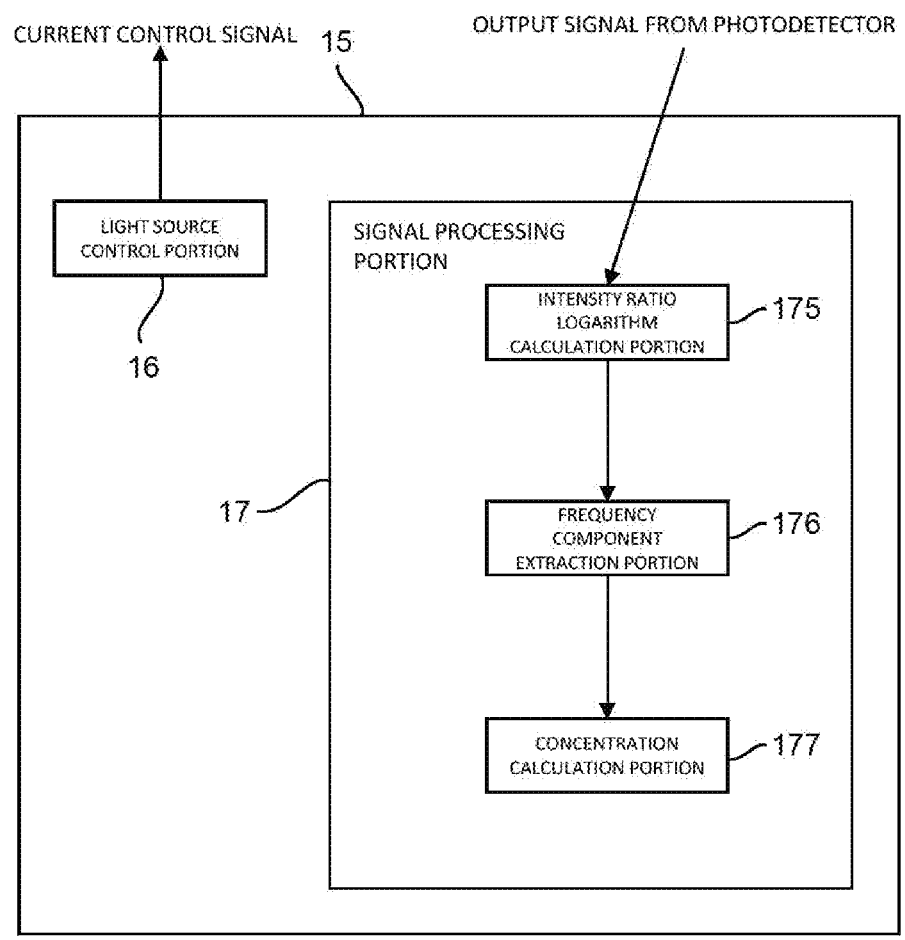
FIG. 7 is a function block diagram of a signal processing device of a second embodiment.

As is shown in FIG. 7, the signal processing portion 17 of the second embodiment is formed by an intensity ratio logarithm calculation portion 175, a frequency component extraction portion 176, and a concentration calculation portion 177 or the like.

The intensity ratio logarithm calculation portion 175 calculates a logarithm (hereinafter, referred to as an 'intensity ratio logarithm') of a ratio between a light intensity of the laser light transmitted through the cell 11 (hereinafter, referred to as 'transmission light') in a state in which a sample gas is sealed inside the intensity ratio logarithm calculation portion 175, and light absorption by measurement target components contained in this sample gas is generated, and a light intensity of the laser light transmitted through the cell 11 in a state in which there is essentially zero light absorption (hereinafter, referred to as 'reference light').

More specifically, both the light intensity of the transmission light and the light intensity of the reference light are measured by the photodetector 14, and data showing the results of these measurements is stored in a predetermined area of the memory. Next, the intensity ratio logarithm calculation portion 175 calculates an intensity ratio logarithm (hereinafter, referred to as an 'intensity related signal') while referring to this measurement result data. In this way, in the present embodiment, a light absorbance signal may be used as the intensity related signal.

In this manner, as is to be expected, the measurement of the former (hereinafter, referred to as a 'sample measurement') is performed each time for each sample gas. Moreover, the measurement of the latter (hereinafter, referred to as a 'reference measurement') may be performed each time either before or after the measurement of each sample gas. Alternatively, the reference measurement may be performed, for example, just one time at a suitable timing, and the results thereof stored in the memory and used for all of the sample measurements.

Note that, in this embodiment, in order to establish a state in which there is essentially zero light absorption, in a wavelength region in which light absorption of a measurement target component can be observed, a zero gas, which has essentially zero light absorption, for example, $N_2$ gas is sealed inside the cell 11, however, it is also possible for another gas to be used, or for the interior of the cell 11 to be placed in a vacuum. Moreover, it is also possible to provide a cell for performing a reference measurement separately from the cell 11 that is used for the sample measurement, and to split the modulation light from the semiconductor lasers 12 into two branches using a half mirror or the like, and guide one branch respectively to each of the two cells.

The frequency component extraction portion 176 performs lock-in detection on the intensity related signal calculated by the intensity ratio logarithm calculation portion 175 using a sinusoidal wave signal (i.e., a reference signal) having a frequency of n times the modulation frequency (wherein n is an integer of 1 or greater), and extracts frequency components in the reference signal from the intensity related signal so as to create a synchronous detection signal. Note that the lock-in detection may be performed by means of a digital calculation, or may be performed by means of a calculation that uses an analog circuit. Moreover, the extraction of the frequency components is not limited to being achieved via a lock-in detection and, for example, a method such as a Fourier series expansion may also be used.

The concentration calculation portion 177 calculates a concentration of a measurement target component based on synchronous detection results obtained by the frequency component extraction portion 176.

Next, in conjunction with the foregoing detailed description of the respective portions, an example of an operation of this analysis device 100 will be described.

Firstly, the light source control portion 16 controls the respective semiconductor lasers 121~124, and modulates the wavelength of the laser light in the modulation frequency and taking the peak of the absorption spectrum of the measurement target component as the center.

Next, a zero gas is sealed inside the interior of the cell 11 either by an operator or automatically, and when this zero gas is detected a reference measurement thereof is made by the intensity ratio logarithm calculation portion 175.

Figure 8:
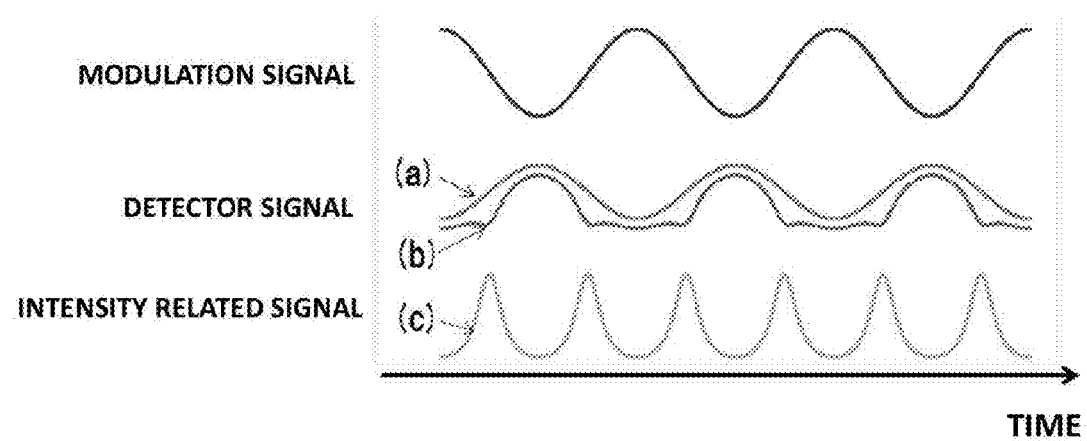
FIG. 8 is a time series graph showing an example of a modulation signal, an output signal from a photodetector, and a measurement result in the second embodiment.

More specifically, the intensity ratio logarithm calculation portion 175 receives an output signal from the photodetector 14 when the zero gas is sealed inside the cell 11, and the values in this output signal are stored in the measurement result data storage portion. The values in the output signal from the photodetector 14 in this reference measurement, in other words, the reference light intensity is shown in a time series graph in FIG. 8 (*a*). In other words, only those changes in the light output that are caused by the modulation of the laser drive current (or voltage) are represented in the output signal from the photodetector 14.

When the sample gas is sealed inside the interior of the cell 11 either by an operator or automatically, the intensity ratio logarithm calculation portion 175 makes a sample measurement. More specifically, the intensity ratio logarithm calculation portion 175 receives an output signal from the photodetector 14 when the sample gas is sealed inside the cell 11, and the values of this output signal are stored in a predetermined area of the memory. The values of the output signal from the photodetector 14 in this sample measurement, in other words, the transmission light intensity is shown in a time series graph in FIG. 8 (*b*). It can be seen that a peak caused by absorption appears every half period of the modulation.

Next, the intensity ratio logarithm calculation portion 175 synchronizes the respective items of measurement data with the modulation period, and calculates an intensity ratio logarithm (i.e., an intensity related signal) between the intensity of the transmission light and the intensity of the reference light. More specifically, the intensity ratio logarithm calculation portion 175 performs arithmetic processing that is equal with that in the following Formula (Equation 4).

$$A(t) = -\ln\left(\frac{D_m(t)}{D_z(t)}\right) \qquad \text{[Equation 4]}$$

Here, $D_m(t)$ is the transmission light intensity, $D_z(t)$ is the reference light intensity, and A (t) is the intensity ratio logarithm (intensity related signal). This intensity related signal is shown in graph form in FIG. 8 (*c*) in which the horizontal axis shows the time.

At this time, it is possible either to calculate the ratio between the transmission light and the reference light and thereafter determine the logarithm, or to determine both a logarithm of the transmission light intensity and a logarithm of the reference light intensity, and to then subtract these.

Next, the frequency component extraction portion 176 performs lock-in detection on the intensity related signal using a reference signal having double the frequency of the modulation frequency, in other words, the frequency component extraction portion 176 extracts frequency components that are double the size of the modulation frequency, and stores a synchronous wave detection signal (hereinafter, referred to as lock-in data) thereof in a predetermined area of the memory.

The values of this lock-in data are values that are proportional to the concentration of the measurement target components. Based on the values of this lock-in data, the concentration calculation portion 177 calculates concentration indication values that show concentrations of the measurement target components.

In this way, according to the above-described structure, even if the intensity of laser light varies due to some reason or other, by adding a fixed offset to the above-described intensity ratio logarithm, the waveform itself is prevented from changing. Accordingly, because the values of the respective frequency components that have been calculated by performing the above-described lock-in detection do not change, and neither is there any change in the concentration indication values, highly accurate measurements can be anticipated.

The reasons for this will now be described in more detail.

Generally, a Fourier series expansion performed on the intensity related signal A (t) can be expressed by the following formula (Equation 5).

Note that $a_n$ in the formula (Equation 5) is a value that is proportional to the concentration of the measurement target component, and the concentration calculation portion 177 calculates the concentration indication value showing the concentration of the measurement target component based on this value $a_n$.

$$A(t) = a_0 + \sum_{n=1}^{\infty} a_n \cos(2\pi n f_m t + \phi_n) \quad \text{[Equation 5]}$$

Here, $f_m$ is the modulation frequency, and n is a multiple of the modulation frequency.

In contrast, A (t) is expressed in the above described Equation 4.

Next, an intensity related signal A' (t) in a case in which the laser light intensity changes during the measurement by a factor of α due to some reason or other is expressed in the manner shown by the following formula (Equation 6).

$$A'(t) = -\ln\left(\frac{\alpha D_m(t)}{D_z(t)}\right) = -\ln\left(\frac{D_m(t)}{D_z(t)}\right) - \ln(\alpha) = A(t) - \ln(\alpha) \quad \text{[Equation 6]}$$

As is clear from this formula (Equation 6), A' (t) is found simply by adding $-\ln(\alpha)$, which is a fixed value, to the intensity related signal A (t) obtained when there is no variation in the laser light intensity, and it can be seen that there is no change in the value $a_n$ of each frequency component even if there is a change in the laser light intensity.

Accordingly, there are no effects on the concentration indication values which are determined based on the value of the frequency component which is twice the value of the modulation frequency.

The above is an example of an operation of the sample analysis device 100 in a case in which no interference components other than the measurement target component are present in the sample gas.

Next, an example of an operation of the sample analysis device 100 in a case in which either one or a plurality of interference components that have light absorption in the peak light absorption wavelength of the measurement target component (for example, $H_2O$) are contained in the sample gas will be described.

Firstly, a description of the principle will be given.

Because the light absorption spectrums of the measurement target component and the interference component have mutually different shapes, the intensity related signals in a case in which the respective components thereof are present individually have mutually different waveforms, and the proportion of each frequency component is different from the others (i.e., linear independence). Utilizing this aspect, it is possible to obtain concentrations of measurement target components in which the effects of interference have been corrected by solving simultaneous equations using the relationship between the values of the respective frequency components of the measured intensity related signals, and the respective frequency components of the intensity related signals of the measurement target components and the frequency components which have been determined in advance.

If the intensity related signals per unit concentration in a case in which the measurement target components and the interference components are present individually are taken as $A_m$ (t) and $A_i$ (t), and the respective frequency components of the respective intensity related signals are taken as $a_{nm}$ and $a_{ni}$, then the following formulas (Equation 7 and Equation 8) are established.

$$A_m(t) = a_{0m} + \sum_{n=1}^{\infty} a_{nm} \cos(2\pi n f_m t + \phi_n) \quad \text{[Equation 7]}$$

$$A_i(t) = a_{0i} + \sum_{n=1}^{\infty} a_{ni} \cos(2\pi n f_m t + \phi_n) \quad \text{[Equation 8]}$$

The intensity related signal A (t) in a case in which concentrations of the measurement target components and the interference components are present respectively as $C_m$ and $C_i$ is expressed by the following formula (Equation 9) using the linearity of each light absorbance.

$$A(t) = C_m A_m(t) + C_i A_i(t) \quad \text{[Equation 9]}$$

$$C_m\left(a_{0m} + \sum_{n=1}^{\infty} a_{nm}\cos(2\pi n f_m t + \phi_n)\right) +$$

$$C_i\left(a_{0i} + \sum_{n=1}^{\infty} a_{ni}\cos(2\pi n f_m t + \phi_n)\right)$$

$$= a_{0m}C_m + a_{0i}C_i + \sum_{n=1}^{\infty}(a_{nm}C_m + a_{ni}C_i)\cos(2\pi n f_m t + \phi_n)$$

Here, if the frequency components of $f_m$ and $2f_m$ of A (t) are taken respectively as $a_1$ and $a_2$, then using the above formula (Equation 9) the following simultaneous equations (Equation 10) are established.

$$a_{1m}C_m + a_{1i}C_i = a_1$$
$$a_{2m}C_m + a_{2i}C_i = a_2 \quad \text{[Equation 10]}$$

Because the respective frequency components $a_{nm}$ and $a_{ni}$ (wherein n is a natural number; here, n=1, 2) in a case in which the respective measurement subject components and interference components are present individually can be determined in advance by supplying the respective span gases, it is possible to determine the concentration $C_m$ of the measurement target gas from which interference components have been removed by performing the simple and reliable calculation of solving the simultaneous equations of the above formula (Equation 10).

An operation of the analysis device 100 that is based on the above-described principle will now be described.

The analysis device 100 in this case stores, in a predetermined area of the memory, the frequency components $a_{1m}$, $a_{2m}$, and $a_{2i}$ of the respective intensity related signals that are obtained in a case in which the measurement target components and interference components are present individually by, for example, supplying a span gas in advance and making preliminary measurements. More specifically, in the same way as in the preceding example, in each of the measurement target components and interference components, the measurement target light intensity and the reference light intensity are measured, intensity ratio logarithms (i.e., intensity related signals) are then calculated for each of these, and lock-in detection is performed from these intensity ratio logarithms so as to determine the frequency components $a_{1m}$, $a_{2m}$, $a_{1i}$, and $a_{2i}$, which are then stored. Note that, instead of the frequency components, it is also possible to store the intensity related signals $A_m(t)$ and $A_i(t)$ per unit concentration, and to calculate the frequency components $a_{1m}$, $a_{2m}$, $a_{1i}$, and $a_{2i}$ from the above formulas (Equation 7 and Equation 8).

After receiving an input or the like from an operator, the analysis device 100 specifies the measurement subject components and the interference components.

Next, the intensity ratio logarithm calculation portion 175 calculates the intensity ratio logarithm A (t) in accordance with the formula (Equation 4).

After this, the frequency component extraction portion 176 performs lock-in detection on the intensity ratio logarithm using the modulation frequency $f_m$ and a reference signal having a frequency $2f_m$ that is twice that of the modulation frequency $f_m$ and then extracts the respective frequency components $a_1$ and $a_2$ (i.e., the lock-in data) and stores these in a predetermined area of the memory.

The concentration calculation portion 177 then either applies the values $a_1$ and $a_2$ of the lock-in data and the values of the frequency components $a_{1m}$, $a_{2m}$, $a_{1i}$, and $a_{2i}$ stored in the memory to the formula (i.e., Equation 10), or performs a calculation that is equivalent thereto, and calculates the concentration (or a concentration indication value) $C_m$ that shows the concentration of the measurement target gas from which interference components have been removed. At this time, it is also possible for the concentration (or a concentration indication value) $C_i$ of each interference component to be calculated.

Note that, in the same way, it is also possible, in a case in which it is assumed that two or more interference components are present, to determine the concentration of measurement target components from which interference effects have been removed by adding the same number of higher order frequency components as the number of interference components, and then solving simultaneous equations having the same number of variables as the number of component types.

In other words, generally, in a case in which the measurement target components and interference components are combined together so that n number of types of gases are present, then if an $i \times f_m$ frequency component of a k-th gas type is taken as $a_{ik}$, and a concentration of the k-th gas type is taken as $C_k$, then the following formula (Equation 11) is established.

$$a_{11}C_1 + a_{12}C_2 + a_{13}C_3 + \ldots + a_{1n}C_n = a_1 \quad \text{[Equation 11]}$$
$$a_{41}C_1 + a_{12}C_2 + a_{23}C_3 + \ldots + a_{2n}C_n = a_2$$
$$a_{31}C_1 + a_{32}C_2 + a_{33}C_3 + \ldots + a_{3n}C_n = a_3$$
$$\vdots$$
$$a_{n1}C_1 + a_{n2}C_2 + a_{n3}C_3 + \ldots + a_{nn}C_n = a_n$$

By solving the simultaneous equations having the n number of variables shown by this formula (Equation 11), it is possible to determine the concentration of each gas of the measurement target components and interference components.

Moreover, by adding harmonic components of a greater degree than n, and creating simultaneous equations having a greater number of variables than the number of gas types, it is possible, by using the least squares method, to determine the respective gas concentrations, and to thereby determine a concentration having smaller errors relative to the measured noise.

Additional Embodiments

Note that the present invention is not limited to the above-described embodiments.

Figure 9:
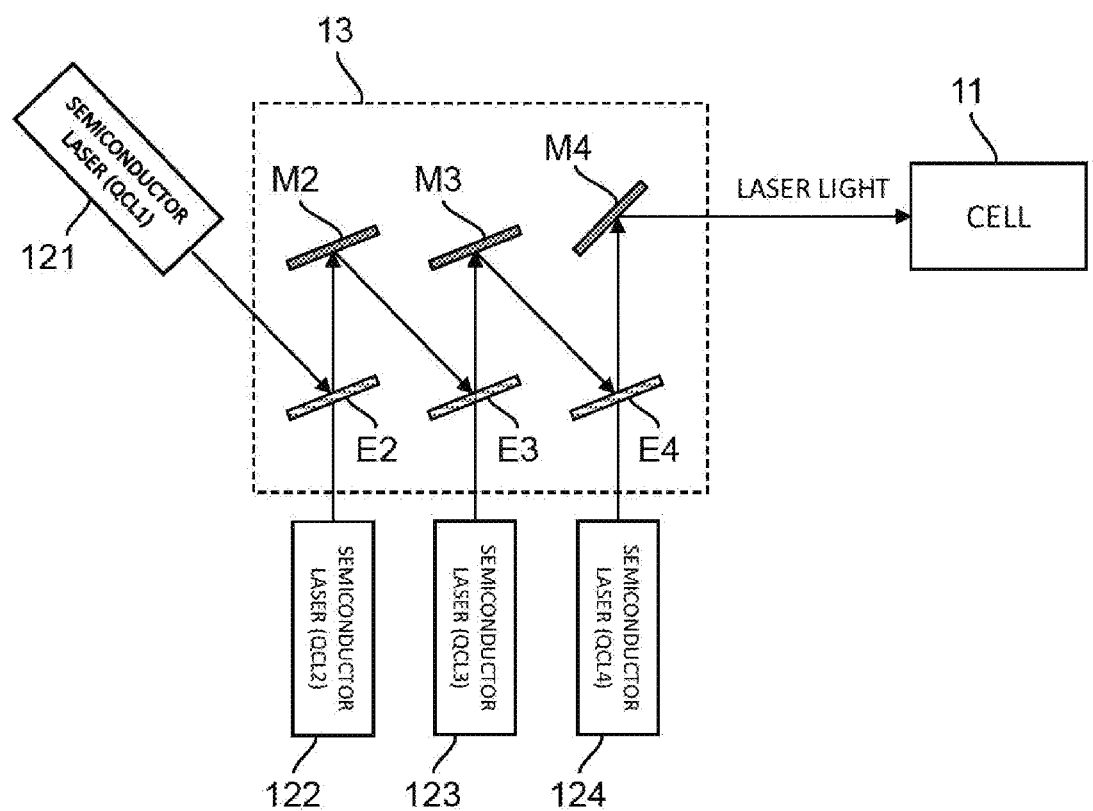
FIG. 9 is a schematic view showing a variant example of an optical system.

For example, in the case of the optical system 13, as is shown in FIG. 9, instead of using the first reflective mirror, it is possible for the light from the first light source 121 to be irradiated directly onto the second optical element E2, or for this light to be irradiated onto the second optical element E2 using two or more reflection mirrors.

Figure 10:
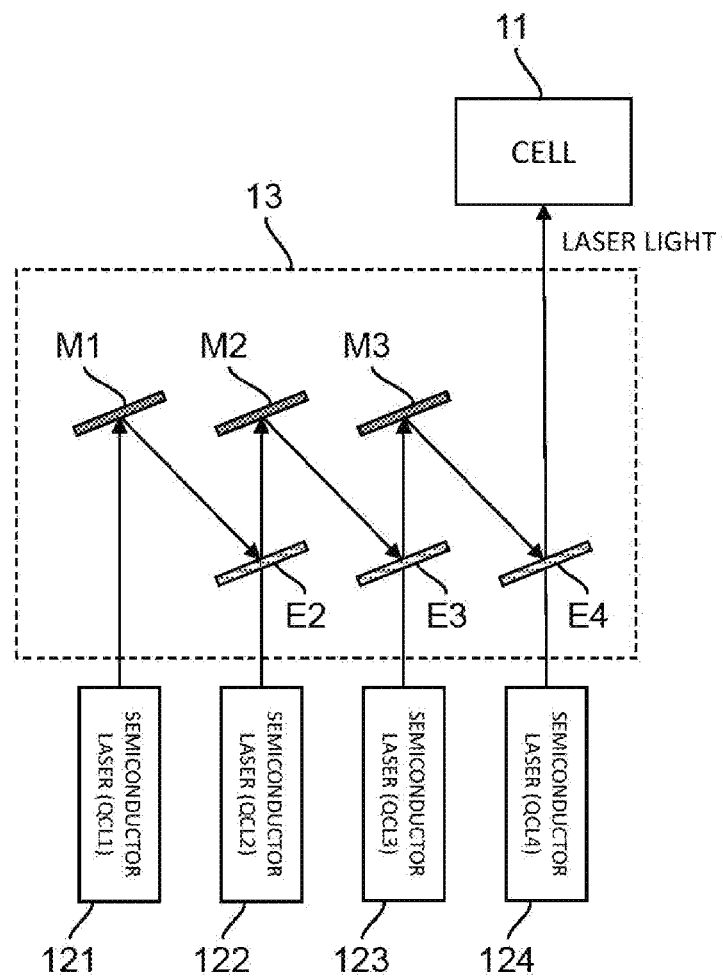
FIG. 10 is a schematic view showing a variant example of an optical system.

Moreover, in the optical system 13 it is also possible to employ a structure in which, as is shown in FIG. 10, the fourth reflective mirror M4 that corresponds to the light source having the shortest optical path to the cell 11 (i.e., the fourth light source 124 in the above-described embodiments) is not used. In this case, a structure is employed in which the light from the first through third light sources 121~123 that has been reflected by the fourth optical element E4, and the light from the fourth light source 124 that has been transmitted through the fourth optical element E4 are directly irradiated onto the cell 11.

In the above-described embodiments a structure having four light sources is used, however, it is also possible to use a structure having three or more light sources.

Figure 11:
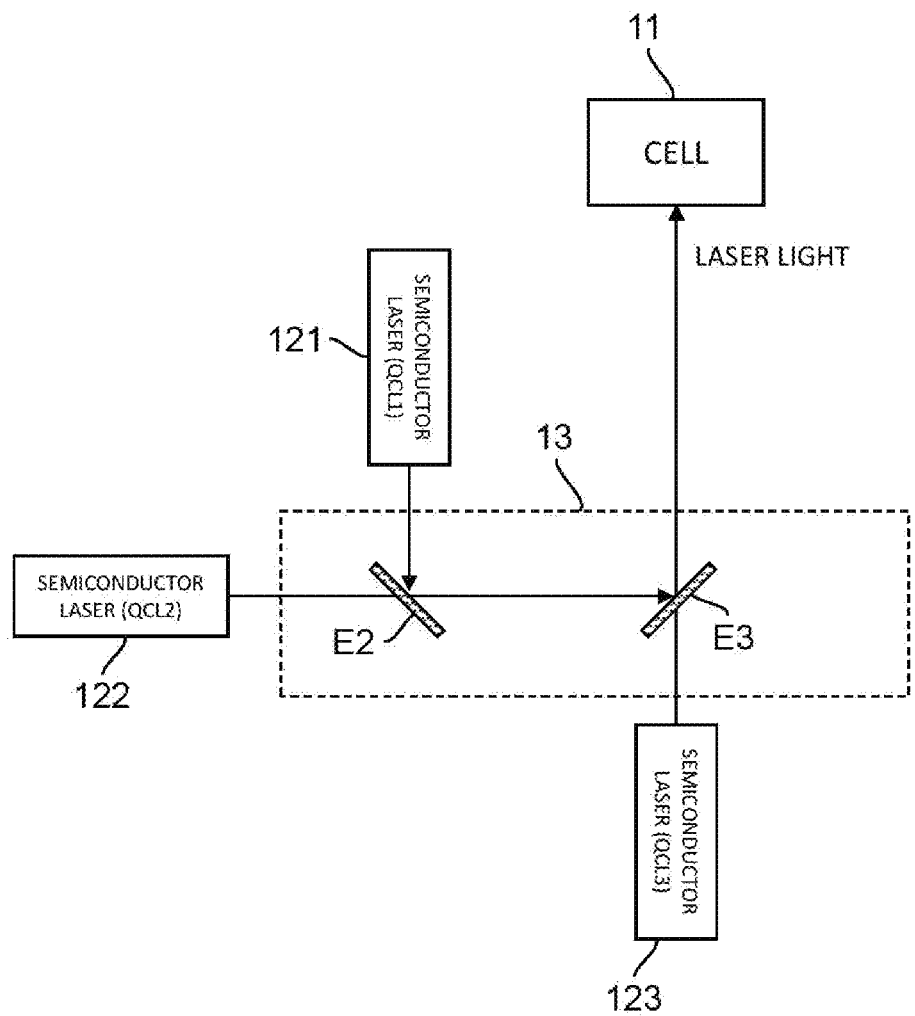
FIG. 11 is a schematic view showing a variant example of an optical system.

As a structure having three or more light sources, a structure, such as that shown in FIG. 11, in which the optical system 13 is formed as simply as possible may be considered. This optical system 13 includes the second optical element E2 that reflects the light from the first light source 121 and transmits the light from the second light source 122, and the third optical element E3 that reflects the light from the first light source 121 that has been reflected by the second optical element E2 and the light from the second light source 122 that has been transmitted through the second optical element E2, and transmits the light from the third light source 123. The light from the first light source 121 and the light from the second light source 122 that have been reflected by the third optical element E3, as well as the light from the second light source 122 that has been transmitted through the third optical element E3 are irradiated onto the cell 11.

In addition to the measurement principle of the above-described embodiments, it is also possible for the analysis device 100 to employ, for example, an NDIR method, an FTIR method, or an NDUV method or the like.

For example, the logarithm calculation portion 171 of the above-described first embodiment performs a logarithmic operation on the light intensity signals from the photodetector 14, however, it is also possible for a logarithm of a ratio (known as the light absorbance) between the intensity of the sample light and the intensity of the modulation light (i.e. the reference light) to be calculated using the light intensity signals from the photodetector 14. At this time, the logarithm calculation unit 171 may calculate the light absorbance by calculating a logarithm of the intensity of the sample light and calculating a logarithm of the intensity of the reference light, and then subtracting these. Alternatively, the logarithm calculation unit 171 may calculate the light absorbance by firstly determining a ratio between the intensity of the sample light and the intensity of the reference light, and then determining a logarithm of this ratio.

Moreover, the correlation value calculation portion 172 of the above-described first embodiment calculates correlation values between the intensity related signals and the feature signals, however, it may instead calculate an inner product value of the intensity related signals and the feature signals.

In addition, in the above-described first embodiment, the storage portion 173 stores individual correlation values that have been corrected using reference correlation values, however, it is also possible to instead employ a structure in which individual correlation values that have not yet been corrected are stored in the storage portion 173, and the concentration calculation portion 174 firstly subtracts the reference correlation values from the uncorrected individual correlation values, and then determines individual correlation values that have undergone a correction so as to convert them into per unit concentrations.

The plurality of feature signals are not limited to those of the above-described first embodiment, and other functions may be used provided that these are mutually different from each other. Moreover, as the feature signals, it is also possible to use functions that show a waveform (i.e., an actually measured waveform) of a light intensity and a logarithmic intensity or light absorbance obtained, for example, by supplying a span gas having a known concentration. In addition, in a case in which the concentration of a single measurement target component is being measured, it is sufficient if there is at least one feature signal.

Figure 12:
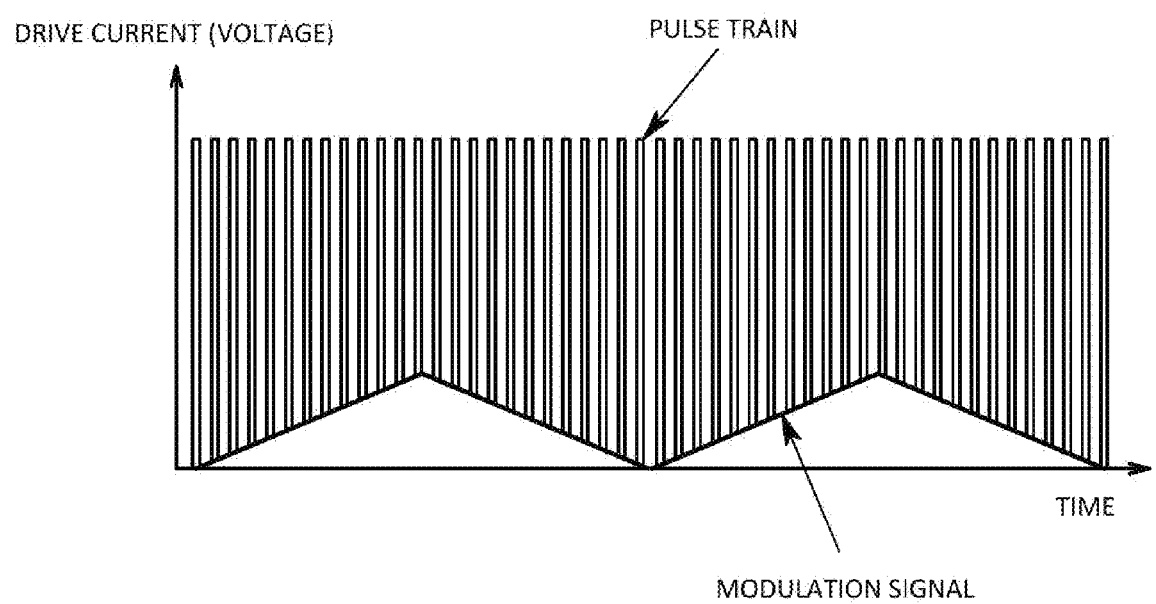
FIG. 12 is a view showing a drive current (or voltage) and a modulation signal in a quasi continuous oscillation.

The light source control portion 16 of the above-described embodiments causes a semiconductor laser to generate a continuous wave (CW) oscillation, however, as is shown in FIG. 12, it is also possible for the semiconductor laser to be made to generate a quasi-continuous wave oscillation (quasi-CW). In this case, the light source control unit 16 controls the current source (or the voltage source) of the respective semiconductor lasers 121~124 by outputting current (or voltage) control signals, and causes the drive current (or the drive voltage) of the current source (or voltage source) to be equal to or greater than a predetermined threshold value for generating a pulse oscillation. More specifically, the light source control portion 16 may generate a quasi-continuous wave oscillation using pulse oscillations having a predetermined pulse width (for example, between 10~50 ns, at a duty ratio of 5%) that are repeated at a predetermined period (for example, between 1~5 MHz). In addition, the light source control portion 16 sweeps the oscillation wavelength of the laser light by generating temperature changes by changing the drive current (or the drive voltage) of the current source (or voltage source) in a predetermined frequency using values for wavelength sweeping that are less than the threshold value for the pulse oscillation. The modulation signal that is used to modulate the drive current changes either in a triangular waveform, a sawtooth waveform, or a sinusoidal waveform, and the frequency thereof is, for example, between 1~100 Hz.

Figure 13:
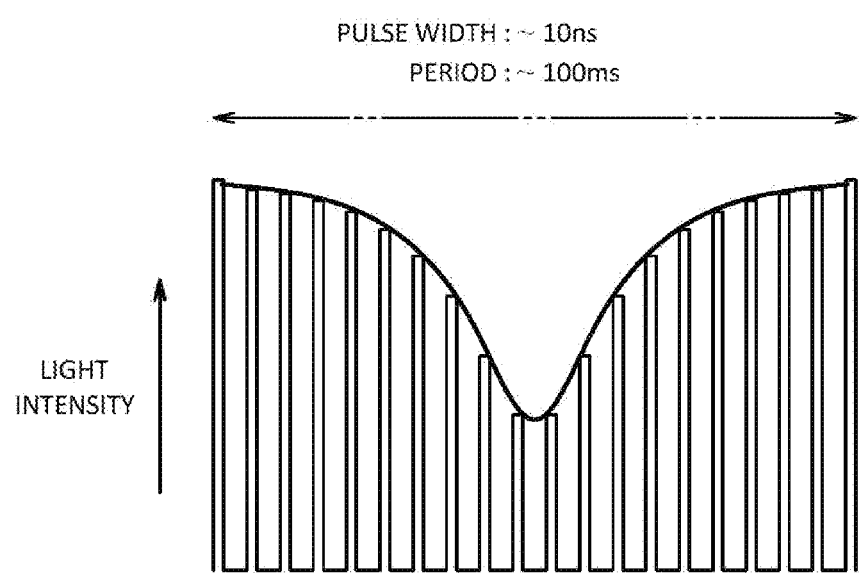
FIG. 13 is a schematic view showing a measurement principle using quasi continuous oscillation.

The light intensity signal obtained by the photodetector 14 after the semiconductor lasers 121~124 have generated a quasi-continuous wave oscillation in this way is shown in FIG. 13. In this way, it is possible to acquire an absorption spectrum over the entire pulse train. The light source of a quasi-continuous wave oscillation has a lower power consumption compared to that of a continuous wave oscillation, and waste heat treatment thereof is also easier. Additionally, a quasi-continuous wave oscillation light source has a longer lifespan.

At this time, the light source control portion 16 controls the plurality of semiconductor lasers 121~124 such that each one has an oscillation wavelength that corresponds to a mutually different measurement target component, and such that they generate pulse oscillations having the same oscillation period as each other, but whose oscillation timings are mutually different.

More specifically, the light source control portion 16 controls the current sources (or the voltage sources) of each of the semiconductor lasers 121~124 by outputting current (or voltage) control signals. As is shown in FIG. 4, the light source control portion 16 of the present embodiment generates a quasi-continuous wave (quasi-CW) oscillation using pulse oscillations having a predetermined pulse width (for example, between 10~100 ns, at a duty ratio of 5%) that are repeated at a predetermined period (for example, between 1~5 MHz).

In addition, as is shown in FIG. 12, the light source control portion 16 sweeps the oscillation wavelength of the laser light by generating temperature changes by changing the drive current (or the drive voltage) of the current source (or voltage source) in a predetermined frequency. As is shown in FIG. 4, the oscillation wavelength of the laser light in each semiconductor laser is modulated so as to be centered on the peak of the light absorption spectrum of the measurement target component. The modulation signal that is used to change the drive current changes either in a triangular waveform, a sawtooth waveform, or a sinusoidal waveform, and the frequency thereof is, for example, between 1~100 Hz. Note that, in FIG. 12, an example in which the modulation signal changes in a triangular waveform is shown.

The light intensity signal obtained by the photodetector 14 after the single semiconductor laser 12 has been made to perform a quasi-continuous wave oscillation in this way is shown in FIG. 13. In this way, it is possible to acquire an absorption spectrum over the entire pulse train.

Figure 14:
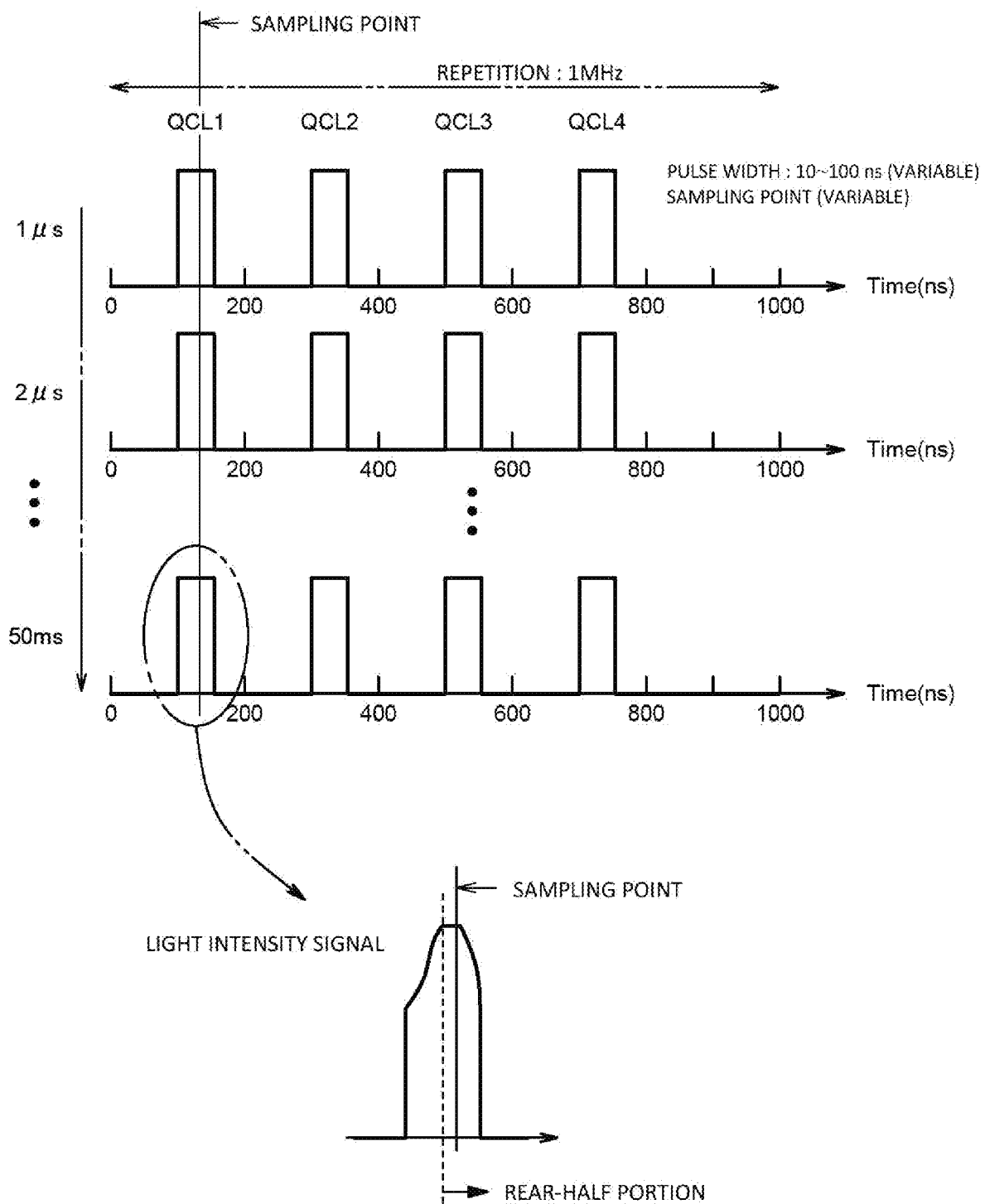
FIG. 14 is a schematic view showing an example of light intensity signals and pulse oscillation timings of a plurality of semiconductor lasers in a variant embodiment.

Moreover, the light source control portion 16 causes the plurality of semiconductor lasers 12 to generate pulse oscillations at mutually different timings from each other. More specifically, as is shown in FIG. 14, the plurality of semiconductors 12 sequentially generate pulse oscillations such that one pulse of each of the remaining semiconductor lasers 12 is contained within one period of the pulse oscillation of one semiconductor laser 12. In other words, one pulse of each of the other semiconductor lasers 12 is contained within the mutually adjacent pulses of one semiconductor laser 12. At this time, the pulses from the plurality of semiconductor lasers 12 are oscillated in such a way that they do not mutually overlap with each other.

Figure 15:
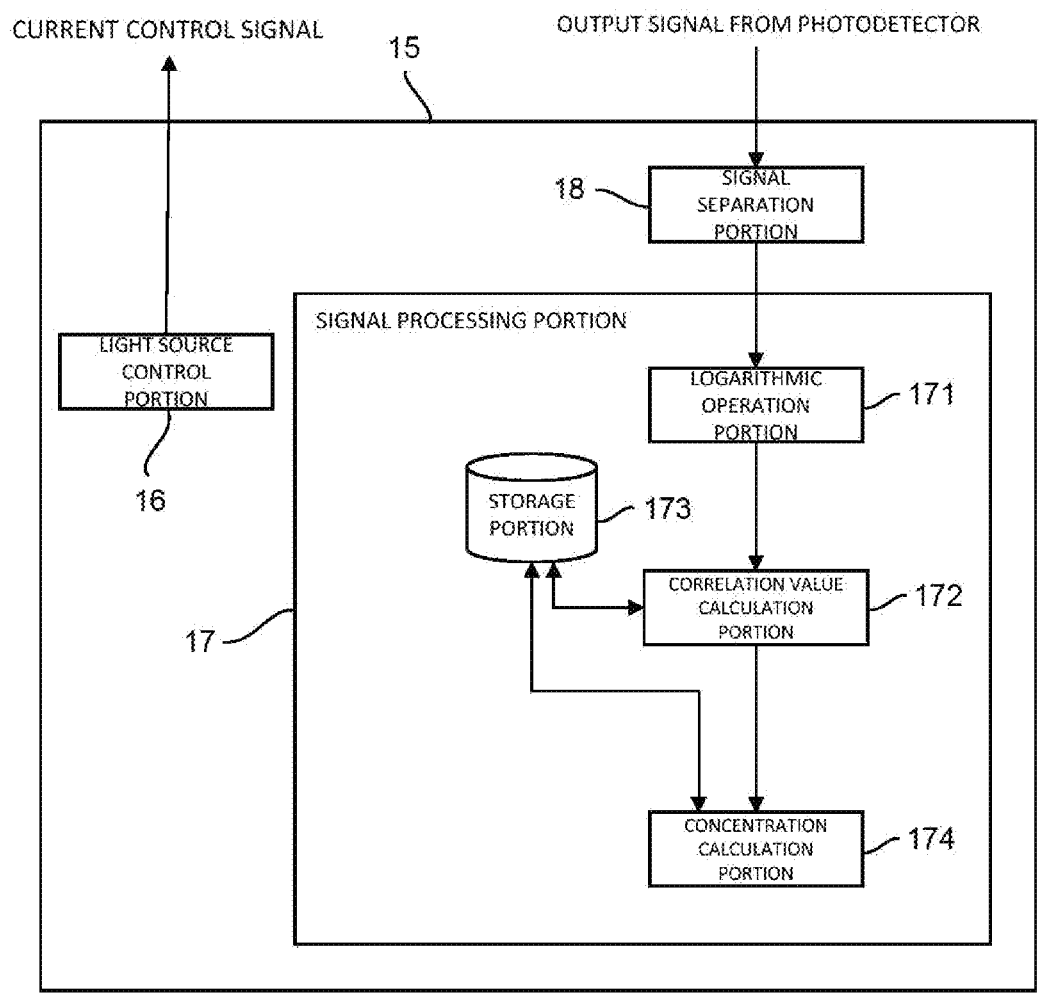
FIG. 15 is a function block diagram of a signal processing device of a variant embodiment.

In addition, as is shown in FIG. 15, this signal processing device 15 is further provided with a signal separation portion 18 that separates the signals from each of the semiconductor lasers 121~124 from the light intensity signals obtained by the photodetector 14.

The signal separation portion 18 separates the respective signals from the plurality of the semiconductor lasers 121~124 from the light intensity signals obtained by the photodetector 14. The signal separation portion 18 of the present embodiment includes a plurality of sample hold circuits that are provided so as to individually correspond to each of the plurality of semiconductor lasers 121~124, and AD converters that convert the light intensity signals separated by these sample hold circuits into digital signals. Note that it is also possible for a single sample hold circuit and AD converter to be used in common by the plurality of semiconductor lasers 121~124.

As is shown in FIG. 14, using sampling signals that have been synchronized with the current (or voltage) control signals for the corresponding semiconductor lasers 121~124, the sample hold circuits separate the signals from the corresponding semiconductor lasers 121~124 from the light intensity signals from the photodetector 14 at timings that are synchronized with the timings of the pulse oscillations from the semiconductor lasers 121~124 and then hold the separated signals. The sample hold circuits are formed so as to separate the signals corresponding to the rear-half portion of the pulse oscillations from the semiconductor lasers 121~124, and to then hold these separated portions. A single light absorption signal is created by combining the plurality of signals from the respective semiconductor lasers 121~124 that were separated by the signal separation portion 18, and it is possible to obtain a light absorption signal having superior wavelength resolution compared to a light absorption signal obtained when one of the semiconductor lasers 121~124 is made to generate a quasi-continuous wave oscillation. Here, because the absorption change position within the pulse is changed by the modulation signal, by collecting signals at the same timings as the pulse oscillations, it is possible to reproduce the waveform. Moreover, because signals that correspond to a portion of the pulse oscillation are separated by the sample hold circuit, the processing speed of the AD converter does not need to be a fast speed. It is also possible for a time average of the plurality of light absorption signals obtained from each one of the respective semiconductor lasers 121~124 to be used.

Using the absorption signals of the respective semiconductor lasers 121~124 that have been separated by the signal separation portion 18 in this way, the signal processing portion 17 calculates the concentration of the measurement target component that corresponds to each of the respective semiconductor lasers 121~124. Note that the calculation of the concentration of the measurement target component performed by the signal processing portion 17 is performed in the same way as in the above-described embodiments.

Moreover, the sample gas is not limited to being an exhaust gas and air may instead be used as the sample gas. In addition, a liquid or a solid may also be used. In the same way, the present invention can also be applied even if the measurement target component is not a gas, but is instead a liquid or a solid.

The light sources are also not restricted to being semiconductor lasers, and other types of lasers may instead be used. Moreover, provided that the light source is a single wavelength light source having a sufficient half width to guarantee measurement accuracy, and is able to undergo wavelength modulation, then any type of suitable light source may be used. Furthermore, the present invention is not limited to calculating the light absorbance of light that has penetrated and been transmitted through the measurement target, but may also be used to calculate light absorbance caused by reflection.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the present invention, in an analysis device that irradiates light from three or more light sources onto a cell, it is possible to prevent a reduction in the intensity of light from each light source.

What is claimed is:

1. An analysis device that analyzes measurement target components contained within a sample, comprising:
a cell into which the sample is introduced;
a plurality of light sources including at least a first light source, a second light source, and a third light source, wherein each of the plurality of light sources outputs light at a mutually different timing;
an optical system that guides light from the respective light sources onto the cell;
a photodetector that detects an intensity of light that is transmitted through the cell; and
a signal processor that calculates a concentration of the measurement target components on an intensity-related signal related to the intensity of light detected by the photodetector, wherein the optical system comprises:
a first light source reflection mirror that reflects the light from the first light source;
a second light source optical element that reflects the light from the first light source that has been reflected by the first light source reflection mirror and transmits the light from the second light source;
a second light source reflection mirror that reflects the light from the first light source that has been reflected by the second light source optical element and the light from the second light source that has been transmitted through the second light source optical element; and
a third light source optical element that reflects the light from the first light source and the light from the second light source that have been reflected by the second light source reflection mirror, and transmits the light from the third light source, wherein each of the second light source optical element and the third light source optical element is a wedged optical element, wherein the light from the first light source is guided onto the cell by sequential reflection without having been transmitted through the second light source optical element and the third light source optical element to prevent reduction in intensity of the light from the first light source, wherein the light from the second light source is guided onto the cell by transmission through the second light source optical element and sequential reflection without having been transmitted through the third light source optical element to prevent reduction in intensity of the light from the second light source, and wherein the light from the third light source is guided onto the cell by transmission through the third light source optical element and sequential reflection to prevent reduction in intensity of the light from the third light source.

2. The analysis device according to claim 1, wherein the optical system further comprises a third light source reflection mirror that reflects the light from the first light source and the light from the second light source that have been reflected by the third light source optical element, and the light from the third light source that has been transmitted through the third light source optical element.

3. The analysis device according to claim 1, wherein the respective reflection mirrors and the respective optical elements are positioned such that an angle of incidence of the reflection light is less than 45 degrees.

4. The analysis device according to claim 1, wherein wavelengths of the light emitted by each of the first light source, the second light source, and the third light source are all mutually different from each other.

5. The analysis device according to claim 1, wherein the first light source, the second light source, and the third light source are arranged in sequence from the light source having the shortest emitted light wavelength, and
the second light source optical element transmits light having a wavelength equal to or longer than that of the light from the second light source, and
the third light source optical element transmits light having a wavelength equal to or longer than that of the light from the third light source.

6. The analysis device according to claim 1, wherein the first light source, the second light source, and the third light source are arranged in sequence from the light source having the longest emitted light wavelength, and
the second light source optical element transmits light having a wavelength equal to or shorter than that of the light from the second light source, and
the third light source optical element transmits light having a wavelength equal to or shorter than that of the light from the third light source.

7. The analysis device according to claim 1, wherein the signal processor further comprises:
a correlation value calculation portion that calculates correlation values between intensity related signals that relate to the intensity of the light detected by the photodetector and feature signals from which a predetermined correlation with the intensity related signals is able to be obtained; and
a concentration calculation portion that calculates concentrations of the measurement target components using the correlation values.

8. The analysis device according to claim 1, wherein the respective light sources emit modulated light that has been modulated using a predetermined modulation frequency, and
wherein the signal processor further comprises:
a frequency component extraction portion that extracts n-fold (wherein n is an integer of 1 or greater) frequency components of the modulation frequency from the intensity related signals relating to the intensity of the light detected by the photodetector; and
a concentration calculation portion that calculates concentrations of the measurement target components based on results of the frequency component extraction performed by the frequency component extraction portion.

9. An analysis device that analyzes measurement target components contained within a sample that contains one or more interference components, comprising:
a cell into which the sample is introduced;
a plurality of light sources including at least a first light source, a second light source, and a third light source, wherein each of the plurality of light sources outputs light at a mutually different timing;
an optical system that guides light from the respective light sources onto the cell;
a photodetector that detects an intensity of light that is transmitted through the cell; and
a signal processing device that calculates a concentration of the measurement target components on an intensity-related signal related to the intensity of light detected by the photodetector, wherein the optical system comprises:
a first light source reflection mirror that reflects the light from the first light source;
a second light source optical element that reflects the light from the first light source that has been reflected by the first light source reflection mirror and transmits the light from the second light source;
a second light source reflection mirror that reflects the light from the first light source that has been reflected by the second light source optical element and the light from the second light source that has been transmitted through the second light source optical element; and
a third light source optical element that reflects the light from the first light source and the light from the second light source that have been reflected by the second light source reflection mirror, and transmits the light from the third light source, wherein the light from the first light source is guided onto the cell by sequential reflection without having been transmitted through the second light source optical element and the third light source optical element to prevent reduction in intensity of the light from the first light source, wherein the light from the second light source is guided onto the cell by transmission through the second light source optical element and sequential reflection without having been transmitted through the third light source optical element to prevent reduction in intensity of the light from the second light source, wherein the light from the third light source is guided onto the cell by transmission through the third light source optical element and sequential reflection to prevent reduction in intensity of the light from the third light source, and wherein the signal processing device comprises:
a correlation value calculation portion that calculates correlation values between intensity related signals that relate to the intensity of the light detected by the photodetector and feature signals from which a predetermined correlation with the intensity related signals is able to be obtained;
a concentration calculation portion that calculates concentrations of the measurement target components using the correlation values obtained by the correlation value calculation portion; and a storage portion that stores individual correlation values which are the respective correlation values per unit concentration for the measurement target components and each interference component determined from the respective intensity related signals and the feature signals in a case in which the measurement target components and each of the interference components are present individually, and the concentration calculation portion calculates concentrations of the measurement target component based on the correlation values obtained by the correlation value calculation portion, and on the individual correlation values stored in the storage portion.

\* \* \* \* \*